United States Patent
Pounanov et al.

(10) Patent No.: US 12,193,616 B2
(45) Date of Patent: *Jan. 14, 2025

(54) SELF-LOWERING TOILET SEAT SYSTEM

(71) Applicant: Cleana Inc., Wyckoff, NJ (US)

(72) Inventors: Max Pounanov, Belmont, MA (US);
Mingyuan Li, Cambridge, MA (US);
Greg Blonder, Brookline, MA (US)

(73) Assignee: Cleana Inc., Wyckoff, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/284,262

(22) PCT Filed: May 15, 2023

(86) PCT No.: PCT/US2023/022288
§ 371 (c)(1),
(2) Date: Sep. 26, 2023

(87) PCT Pub. No.: WO2024/030169
PCT Pub. Date: Feb. 8, 2024

(65) Prior Publication Data
US 2024/0382051 A1    Nov. 21, 2024

Related U.S. Application Data

(63) Continuation of application No. 17/987,746, filed on Nov. 15, 2022, now Pat. No. 11,910,968.
(Continued)

(51) Int. Cl.
*A47K 13/10* (2006.01)
*A47K 13/12* (2006.01)
(52) U.S. Cl.
CPC .............. *A47K 13/10* (2013.01); *A47K 13/12* (2013.01)

(58) Field of Classification Search
CPC .............................. A47K 13/10; A47K 13/12
See application file for complete search history.

(56) References Cited

U.S. PATENT DOCUMENTS

| 2,676,047 A | 4/1954 | Gould |
| 3,182,857 A | 5/1965 | Bischoff et al. |

(Continued)

FOREIGN PATENT DOCUMENTS

| CA | 1113049 A | 11/1981 |
| CN | 203207951 U | 9/2013 |

(Continued)

OTHER PUBLICATIONS

International Search Report and Written Opinion for International Application No. PCT/US2022/049993, mailed May 10, 2023, 15 pages.

(Continued)

*Primary Examiner* — Christine J Skubinna
(74) *Attorney, Agent, or Firm* — Nutter McClennen & Fish LLP

(57) ABSTRACT

A self-lowering toilet seat system includes a toilet bowl and a toilet seat. The system includes a hinge rotatably coupling the toilet seat and the toilet bowl. The hinge is configured so that the toilet seat is transitionable between a down position and an up position. A lowering device is configured to self-lower the toilet seat towards the down position. A fixedly sealed hinge housing has a delay device therein. The delay device is configured to cause a seat time delay before the lowering device causes the toilet seat to lower towards the down position. The delay device is engaged by applying a seat lifting force to raise the toilet seat towards the up position and removing the seat lifting force from the toilet (Continued)

seat. The delay device is configured to reset the seat time delay when the lifting force is reapplied before the delay device has expired.

40 Claims, 29 Drawing Sheets

Related U.S. Application Data

(60) Provisional application No. 63/395,168, filed on Aug. 4, 2022.

(56) References Cited

U.S. PATENT DOCUMENTS

| | | | |
|---|---|---|---|
| 3,404,411 A | 10/1968 | Newkirk | |
| 3,796,041 A | 3/1974 | Boult | |
| 4,053,961 A | 10/1977 | Wilson et al. | |
| 4,220,266 A | 9/1980 | Braden et al. | |
| 4,402,092 A | 9/1983 | Smallwood | |
| 4,428,083 A | 1/1984 | Chuang | |
| 4,491,989 A | 1/1985 | McGrail | |
| 4,887,322 A * | 12/1989 | Lydon | A47K 13/10 4/246.1 |
| 4,910,810 A | 3/1990 | Solomon | |
| 4,951,325 A | 8/1990 | Tack | |
| 5,101,518 A | 4/1992 | Phillips | |
| 5,138,724 A | 8/1992 | Chien et al. | |
| 5,279,000 A | 1/1994 | Mercier et al. | |
| 5,369,814 A | 12/1994 | Denys | |
| 5,435,017 A | 7/1995 | Pan | |
| 5,461,734 A | 10/1995 | Faircloth | |
| 5,504,947 A | 4/1996 | Robellop et al. | |
| 5,604,936 A | 2/1997 | Mausolf | |
| 5,867,843 A | 2/1999 | Robello et al. | |
| 5,896,592 A | 4/1999 | Santa Cruz et al. | |
| 5,974,595 A | 11/1999 | McCabe | |
| 5,996,132 A | 12/1999 | Sorimachi | |
| 6,138,289 A | 10/2000 | Sardo | |
| 6,170,797 B1 | 1/2001 | Kimura et al. | |
| 6,510,562 B1 | 1/2003 | Bae et al. | |
| 6,643,852 B1 | 11/2003 | Lin | |
| 6,684,416 B1 | 2/2004 | Chao et al. | |
| 6,725,984 B2 | 4/2004 | Orita | |
| 7,039,961 B1 | 5/2006 | Kirk | |
| 7,293,297 B2 | 11/2007 | Hayashi et al. | |
| 7,331,706 B2 | 2/2008 | Gabathuler et al. | |
| 7,398,564 B2 | 7/2008 | Andersen | |
| 7,788,741 B2 | 9/2010 | Lohss | |
| 8,117,684 B1 | 2/2012 | Strapp | |
| 8,214,932 B2 | 7/2012 | Shannon | |
| 8,347,423 B2 | 1/2013 | Baumoel | |
| 8,739,321 B2 | 6/2014 | Trout | |
| 9,044,122 B2 | 6/2015 | Corbell et al. | |
| 9,901,224 B2 | 2/2018 | Rubashkin | |
| 10,791,888 B1 | 10/2020 | Doctor | |
| 11,096,530 B2 | 8/2021 | Henderson et al. | |
| 11,910,968 B2 | 2/2024 | Li et al. | |
| 11,950,733 B2 | 4/2024 | Pounanov et al. | |
| 2004/0168897 A1 | 9/2004 | Heien | |
| 2004/0261164 A1 | 12/2004 | Junkins | |
| 2005/0223480 A1 | 10/2005 | Miller et al. | |
| 2007/0192949 A1 | 8/2007 | Pan et al. | |
| 2008/0010733 A1 | 1/2008 | Lambert | |
| 2008/0023967 A1 | 1/2008 | King et al. | |
| 2009/0188029 A1 | 7/2009 | Ta et al. | |
| 2010/0146689 A1 | 6/2010 | Yang | |
| 2012/0180208 A1 | 7/2012 | White | |
| 2018/0228323 A1 | 8/2018 | Nishiyama | |
| 2020/0375417 A1 | 12/2020 | Thorne | |
| 2023/0148804 A1 | 5/2023 | Li et al. | |
| 2023/0389758 A1 | 12/2023 | Li et al. | |
| 2024/0041272 A1 | 2/2024 | Pounanov et al. | |
| 2024/0148200 A1 | 5/2024 | Li et al. | |

FOREIGN PATENT DOCUMENTS

| | | | |
|---|---|---|---|
| EP | 1462884 A2 | 9/2004 | |
| EP | 2369971 A1 | 10/2011 | |
| WO | 9306765 A1 | 4/1993 | |
| WO | WO-9923927 A1 * | 5/1999 | A47K 13/10 |
| WO | 0187129 A1 | 11/2001 | |
| WO | 2005102135 A1 | 11/2005 | |
| WO | 2008133745 A1 | 11/2008 | |
| WO | 2010134795 A1 | 11/2010 | |

OTHER PUBLICATIONS

International Search Report and Written Opinion for International Application No. PCT/US23/22288, mailed Aug. 18, 2023, 23 pages.
Tang, K. Linkedin Post. Jan. 5, 2023. Retrieved on Jan. 6, 2023 from https://www.linkedin.com/feed/update/urn:li:activity:7016893566668931073, 4 pages.
International Search Report and Written Opinion for International Application No. PCT/US24/26316, mailed Sep. 30, 2024, 12 pages.

* cited by examiner

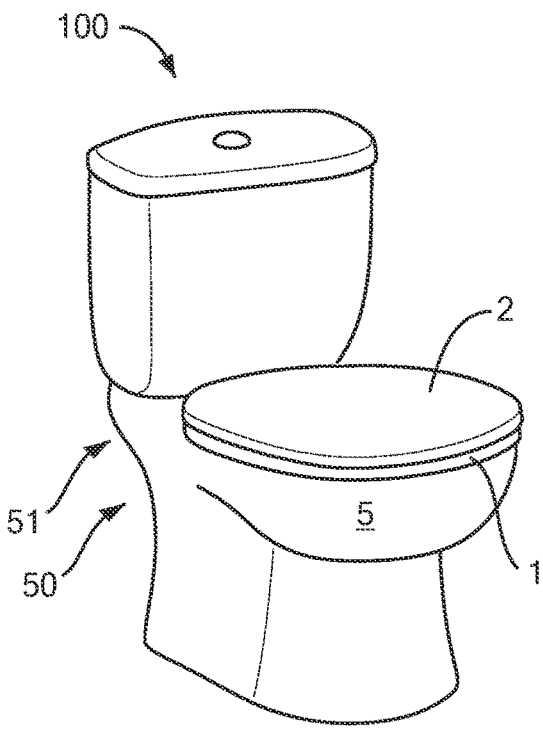
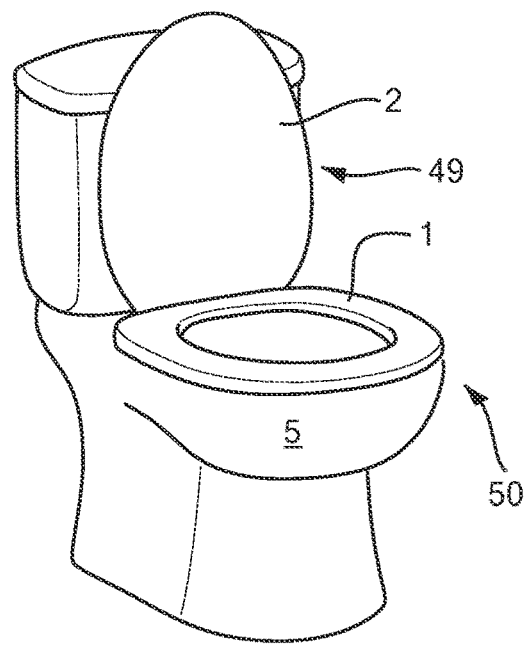
FIG. 3A  FIG. 3B
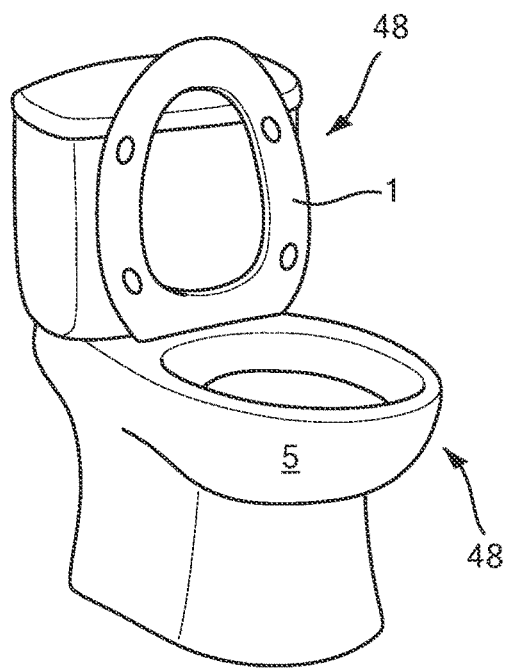
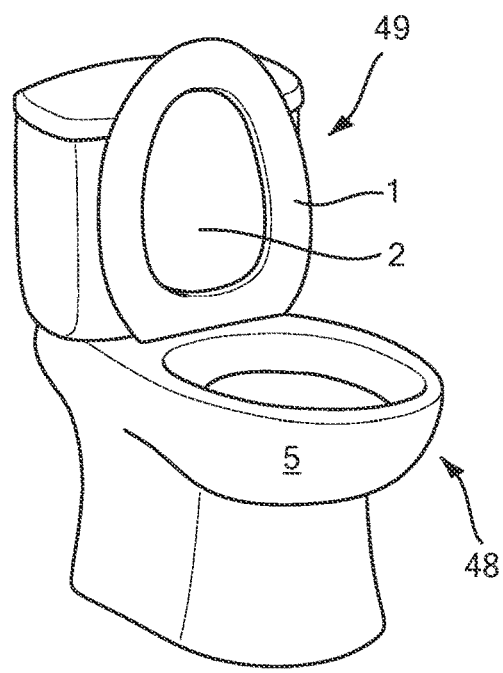
FIG. 3C  FIG. 3D

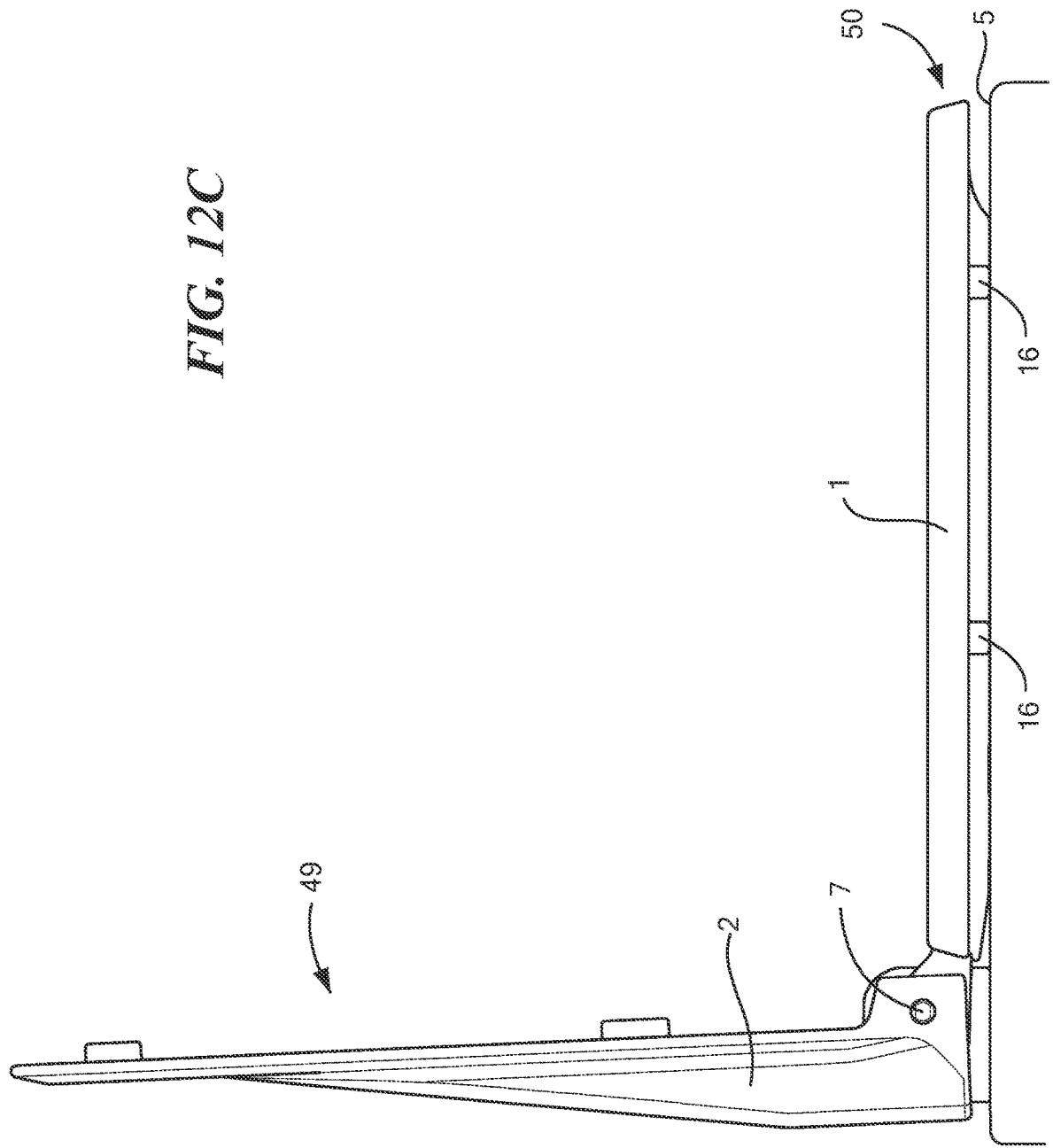

SELF-LOWERING TOILET SEAT SYSTEM

PRIORITY

This patent application is a national stage application, filed under 35 U.S.C. § 371, of and claims priority to International application number PCT/US2023/022288, filed May 15, 2023, which claims priority from provisional U.S. patent application No. 63/395,168, filed Aug. 4, 2022, and U.S. patent application Ser. No. 17/987,746, filed Nov. 15, 2022, the disclosures of which are incorporated herein, in their entireties, by reference.

FIELD OF THE INVENTION

Illustrative embodiments generally relate to toilet seats and, more particularly, illustrative embodiments relate to self-lowering toilet seats.

BACKGROUND OF THE INVENTION

Toilet seats in public restrooms are frequently soiled, particularly in male and gender-neutral restrooms because men often urinate standing up while the toilet seat is in the down position. Soiling of toilet seats can also occur in female restrooms. Because restroom facilities do not belong to the users, people often have little consideration for the messes they cause. This means that users are less likely to lift the seat up before use, more likely to make messes, and less likely to clean up after themselves if they do make a mess. Conversely, in the home, users of a toilet seat often lift the seat to urinate, only to forget to lower it after use.

SUMMARY OF VARIOUS EMBODIMENTS

In accordance with one embodiment of the invention, a self-lowering toilet seat system includes a toilet bowl and a toilet seat configured to be sat upon by a user. The system includes a hinge rotatably coupling the toilet seat and the toilet bowl. The hinge is configured so that the toilet seat is transitionable between a down position and an up position. A lowering device is configured to self-lower the toilet seat towards the down position. A fixedly sealed hinge housing has a mechanical seat delay device therein. The seat delay device is configured to cause a seat time delay before the lowering device causes the toilet seat to lower towards the down position. The seat delay device is engaged by applying a seat lifting force to raise the toilet seat towards the up position and removing the seat lifting force from the toilet seat. The seat delay device is configured to reset the seat time delay when the lifting force is reapplied before the seat delay device has expired.

In various embodiments, the system may include a toilet seat lid rotatably coupled to the hinge. The lid and/or the seat may include a coupling portion, such that the lid is lowered when the seat is lowered by the seat delay device when the coupling portion is engaged. In various embodiments, the delay device is engaged when the seat lifts to the up position.

Among other things, the system may include a second lowering device configured to self-lower the lid towards the down position. The system may also include a lid delay device within the sealed hinge housing. The lid delay device may be configured to cause a lid time delay before the lowering device causes the lid to lower towards the down position. The lid delay device may be engaged by applying a lid lifting force to raise the lid towards the up position and removing the lid lifting force from the lid. The lid delay device may be configured to reset the lid time delay when the user re-applies the lifting force before the lid delay device has expired.

In some embodiments, the lid time delay is equal to or greater than the seat time delay. The duration of the seat time delay and/or the lid time delay may be user adjustable. Some embodiments may include a latching system configured to prevent the lid and/or the seat from moving from the down position towards the up position when the latching system is engaged. The seat time delay may be between about 1 minute and about 60 minutes.

Among other things, the lid delay device may include a suction cup and an attachment surface. The temporary adhesion of the cup to the attachment surface delays the lid from self-lowering to the down position. In a similar manner, the seat delay device may include a suction cup and an attachment surface. The temporary adhesion of the cup to the attachment surface delays the seat from self-lowering to the down position. In some embodiments, the attachment surface includes one or more controlled leakage channels.

In various embodiments, the system may include a damper on the seat and/or the lid. A first axle may be coupled with the seat, and a second axle may be coupled with the lid. The first axle and the second axle may be coaxially rotatable. The first axle and the second axle may be translationally fixed relative to one another. Additionally, the first axle and the second axle may be translationally fixed relative to the bowl. However, the first axle and the second axle may rotate relative to one another. The axes of rotation of the seat and the lid may be fixed relative to one another. For example, the first axle and the second axle may rotate around the same axis of rotation. However, some embodiments may include a single axle.

The system may also include a second hinge housing. A second lowering device and a second delay device for the lid may be positioned within the second hinge housing. A perimeter of the first housing and/or the second housing may fit within a footprint defined by a perimeter of the toilet.

In accordance with another embodiment, a self-lowering toilet seat lid system is configured to rotate relative to a toilet seat. A hinge rotatably couples the lid and a toilet bowl. The hinge is configured so that the lid is transitionable between a down position and an up position. A lowering device is configured to self-lower the lid towards the down position. A sealed hinge housing has a mechanical delay device therein. The delay device is configured to cause a lid time delay before the lowering device causes the lid to lower towards the down position, the delay device being engaged by a user applying a lid lifting force to raise the lid towards the up position and removing the lid lifting force from the lid, the delay device configured to reset the lid time delay if the user re-applies the lifting force before the delay device has expired.

The system may include a toilet seat rotatably coupled to the hinge. A duration of the lid time delay may be user adjustable. The lid time delay may be between about 1 minute and about 60 minutes. A latching system may be configured to prevent the lid and/or the seat from moving towards the up position from the down position when the latching system is engaged. The latching system may automatically engage when the seat and lid are full lowered, or may be manually engaged by the user.

In various embodiments, the lid delay device includes a suction cup and an attachment surface. The temporary adhesion of the cup to the attachment surface may delay the lid from self-lowering to the down position. The attachment surface may be part of a plate. The attachment surface may include one or more controlled leakage channels.

In accordance with another embodiment, a system includes a toilet bowl and a hinge rotatably coupling the toilet bowl with a seat and/or a lid. The hinge is configured so that the seat and/or the lid is transitionable between a down position and an up position. A lowering device is configured to self-lower the seat and/or the lid towards the down position. A hinge housing has a mechanical seat delay device therein. The seat delay device is configured to cause a seat time delay before the lowering device causes the seat and/or the lid to lower towards the down position. The seat delay device is engaged by applying a seat lifting force to raise the toilet seat towards the up position and removing the seat lifting force from the toilet seat. The seat delay device is configured to reset the seat time delay when the user re-applies the lifting force before the seat delay device has expired. The mechanical delay device includes a suction cup and an attachment surface. Some embodiments may also include an electronic delay device, in addition to, or instead of the mechanical delay device.

In various embodiments, the temporary coupling of the cup to the attachment surface delays the seat and/or the lid from self-lowering to the down position. The hinge housing may be fixedly sealed. Some embodiments may include a second lowering device configured to self-lower the seat and/or the lid that is not self-lowered by the first lowering device. A lid delay device may be engaged by a raising the lid towards the up position. The lid delay device may be configured to reset the lid time delay when the lid is forced towards the up position before the seat delay device has expired.

In accordance with another embodiment, a device includes a hinge housing having a mechanical seat delay device therein. The housing is configured to couple with a toilet bowl. The housing includes a hinge configured to rotatably couple the toilet bowl with a seat and/or a lid such that the seat and/or the lid is transitionable between a down position and an up position. The housing has a seat delay device therein. The seat delay device is configured to cause a seat time delay before a lowering device causes the seat and/or the lid to lower towards the down position. The seat delay device is engaged by raising the toilet seat towards the up position.

In various embodiments, the seat delay device is configured to reset the seat time delay when the toilet seat is forced towards the up position before the seat delay device has expired. The mechanical delay device may include a suction cup and an attachment surface. The housing may be sealed, for example, fixedly sealed. The axles of the hinge may be fixed relative to one another.

In accordance with yet another embodiment a method self-lowers a toilet seat. The method provides a self-lowering device. The self-lowering device includes a housing having a mechanical seat delay device therein. The housing is coupled with a toilet bowl. The housing includes a hinge configured to rotatably couple the toilet bowl with a seat and/or a lid such that the seat and/or the lid is transitionable between a down position and an up position. The housing has a seat delay device therein. The seat delay device is configured to cause a seat time delay before a lowering device causes the seat and/or the lid to lower towards the down position. The seat delay device may be engaged by raising the toilet seat towards the up position. The seat delay device may be configured to reset the seat time delay when the toilet seat is forced towards the up position before the seat delay device has expired. The method lifts the seat and/or the lid towards the up position to engage a delay system that delays the seat and/or the lid from being lowered by the lowering device. The method self-lowers the seat and/or the lid using the lowering device.

In various embodiments, the delay system provides a predetermined time delay. The seat and/or the lid may be forced towards the up position at any time prior to expiration of the predetermined time delay to reset the predetermined time delay. The toilet seat and/or lid may be manually lowered in a standard manner at any time prior to the expiration of the predetermined time delay without damaging the delay device or the lowering device, and without causing injury to the user. In some embodiments, the lid is freely rotating. In some other embodiments, the seat is freely rotating.

In some embodiments, the mechanical delay device comprises a suction cup and an attachment surface. The attachment surface may be a surface of a plate. A leakage channel may pass through the attachment surface. The leakage channel may be covered by a flow restriction material.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 3A schematically shows a seat down position and lid down position in accordance with illustrative embodiments.

FIG. 3B schematically shows a seat down position and lid up position in accordance with illustrative embodiments.

FIG. 3C schematically shows a seat up position for a toilet without a lid in accordance with illustrative embodiments.

FIG. 3D schematically shows a seat up position and lid up position in accordance with illustrative embodiments.

FIG. 12A-D schematically show the seat and the lid in various positions in accordance with illustrative embodiments.

DESCRIPTION OF ILLUSTRATIVE EMBODIMENTS

In illustrative embodiments, a self-lowering toilet seat system is configured to automatically lower a toilet seat to a seat down position. To that end, the self-lowering toilet seat system has a lowering device configured to bias the toilet seat and/or the lid towards the down position. In illustrative embodiments, a delay device provides a lowering delay for a predetermined amount of time after a user force is removed from a lifted toilet seat. After expiration of the lowering delay, the lowering device moves the seat towards the down position. In some embodiments, the lowering device acts lowers the seat directly (e.g., by acting on the seat) and/or indirectly (e.g., by acting on the lid that pushes on the seat).

Additionally, or alternatively, the self-lowering toilet seat system is configured to self-lower a toilet lid to a lid down position. Thus, the self-lowering toilet seat system may also be referred to as a self-lowering toilet lid system (generally referred to as a lowering system). Details of illustrative embodiments are discussed below.

The lowering system may be configured such that a user may manually lower the seat and/or the lid to the down position at any time without significant resistance, and without damaging the delay device. Advantageously, lowering the lid 2 after use blocks children or pets from accessing the inside of the toilet bowl, as well as prevents items such as phones or towels from dropping into the water. Lowering the seat 1 also assures the seat is normally in the down position (e.g., horizontal) so the user does not inadvertently sit on the toilet bowl rim. Accordingly, various embodiments advantageously provide an overall improved user experience (e.g., in residential settings).

Furthermore, illustrative embodiments advantageously withstand moisture, filth, cleaning chemicals, and other elements typically encountered in commercial or residential restrooms. To that end, illustrative embodiments include a robust housing that is sealed from outside contaminants, and a lowering system that can withstand rough usage for years on end, ensuring long-lasting and dependable performance.

Figure 1:
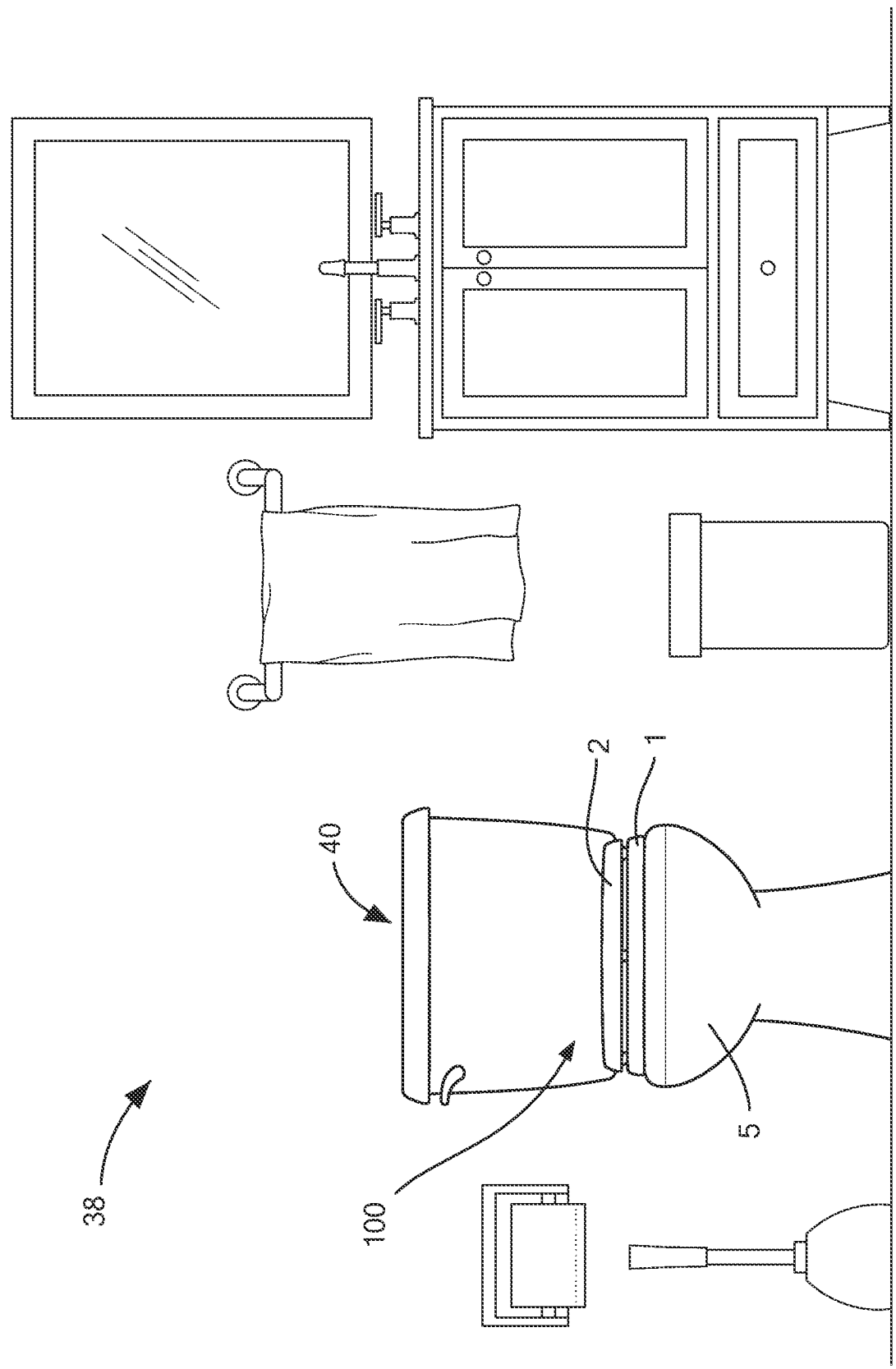
FIG. 1 schematically shows a home bathroom in accordance with illustrative embodiments of the invention.

FIG. 1 schematically shows a home bathroom 38 in accordance with illustrative embodiments of the invention. The bathroom 38 has a toilet 40 that includes the self-lowering system 100 (not visible from this view). The toilet 40 includes a toilet seat 1 upon which a user may sit, a lid 2, and a toilet bowl 5 configured to receive waste from the user. A hinge rotationally couples the toilet seat 1 with the toilet bowl 5. Additionally, the same hinge may rotationally couple the toilet lid 2 with the toilet bowl 5. However, some embodiments may use a different hinge for the seat 1 and the lid 2. In various embodiments, the hinge may include the housing 3, the axle 7, and a connection to the seat 1 and/or the lid 2. Some embodiments may include one or more hinges.

Although illustrative embodiments refer to the toilet 40 in the home bathroom 38, it should be understood that illustrative embodiments apply to toilets 40 in any setting. For example, illustrative embodiments may be applied to portable toilets 40, residential bathroom toilets 40, and/or public restroom toilets 40. Illustrative embodiments provide a passive, non-electrically powered system, and therefore are particularly suited for high-volume settings without nearby electrical connections (e.g., portable toilets at sporting events/festivals). Some embodiments may include a battery-powered system. However, preferred embodiments are non-electrically powered. Undesirably, battery-powered systems are high-maintenance, require the batteries to be replaced at regular intervals (and to be properly disposed of), and the battery connection and access may compromise long-term reliability. Furthermore, as best shown in FIG. 2 the self-lowering system 100 preferably maintains a small footprint, such that a perimeter defined by the housing of the system 100 is within the footprint of the bowl 5.

Figure 2:
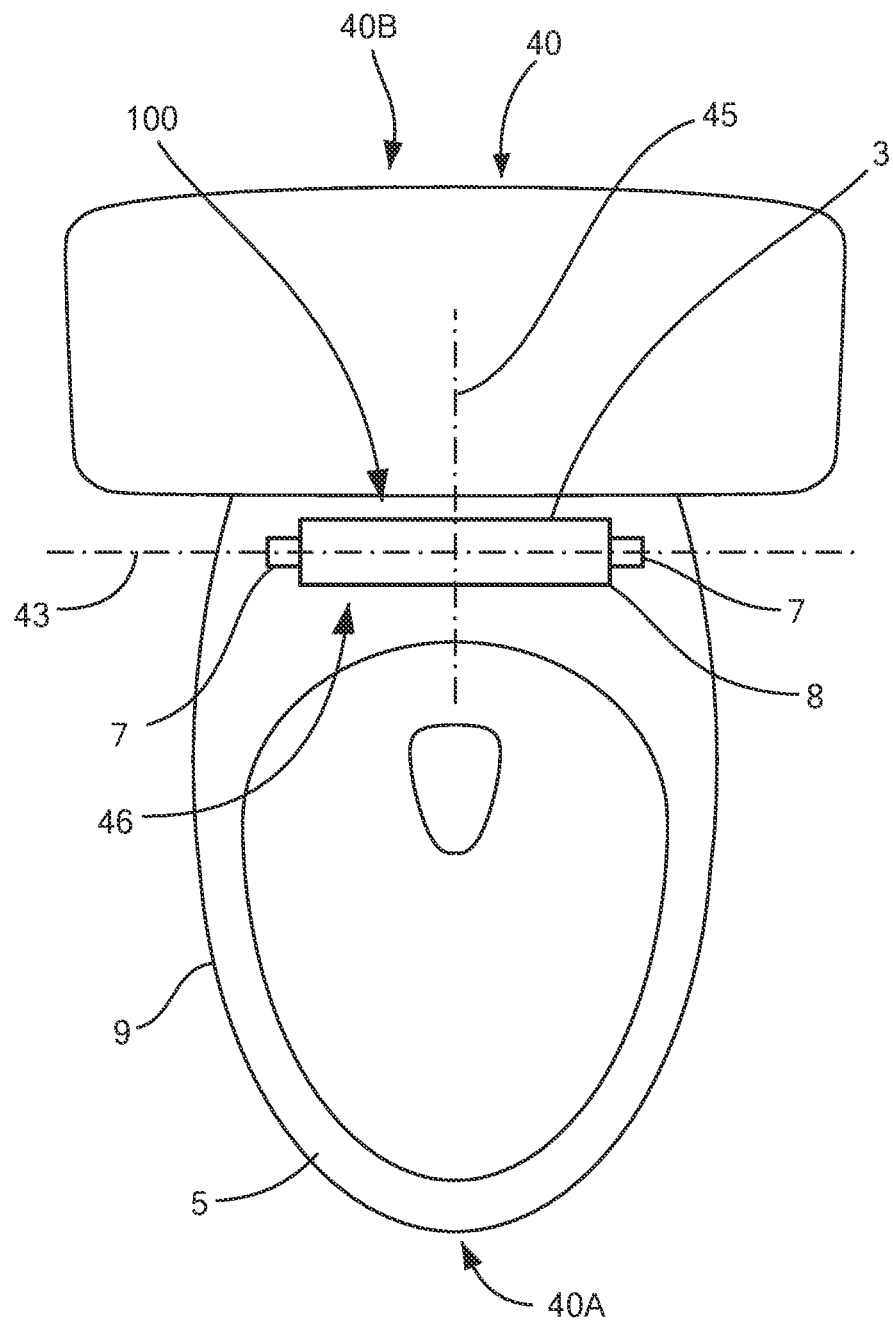
FIG. 2 schematically shows a top-down view of the toilet having the self-lowering system in accordance with illustrative embodiments of the invention.

FIG. 2 schematically shows a top-down view of the toilet 40 having the self-lowering system 100 in accordance with illustrative embodiments of the invention. For the sake of clarity, the seat 1 and lid 2 have been removed, but it should be understood that the seat 1 and/or the lid 2 may be coupled to the hinge 46. Additionally, the axle(s) 7 are truncated, but it should be understood that the axle(s) 7 may be coupled with the seat 1 and/or the lid 2. The hinge 46 has a housing 3 that is preferably sealed from outside contamination. The housing 3 may be formed as a single piece, or from two or more components joined together.

As will be described in more detail further below, the housing 3 may have openings to receive the one or more axles 7 that rotationally couple the seat 1 and/or the lid 2 to the lowering device 52 within the housing 3. In some embodiments, a single axle 7 may be coupled to either one or both the seat 1 and the lid 2. In some other embodiments, a first axle 7S may be coupled to the seat 1, and a second axle 7L may be coupled to the lid 2. In either instance, in various embodiments, the axis of rotation of the seat 1 and/or the lid 2 is preferably translationally fixed relative to one another. In other words, the axes of rotation do not translate relative to one another. In various embodiments, the axes of rotation for the seat 1 and the lid 2 are parallel or coaxial.

The housing 3 has a first axis 43, also referred to as a longitudinal axis 43, and a second axis 45, also referred to as a transverse axis 45. The first axis 43 extends across the toilet 40, i.e., from side to side, and is aligned, or parallel, with an axis of rotation of the seat and/or the toilet (best seen in FIG. 4). The second axis 45 extends in a direction generally from the front 40A to the back 40B of the toilet 40. Generally, these two axes 43, 45 are perpendicular to one another. Preferably, the housing 3 has one or more openings for receiving the axles 7, such that axles 7 are aligned with, or parallel to, the first axis 43. By providing the openings on the side of the housing 3, the axle 7 may be positioned through the side of the housing 3. Positioning the axles 7 on the side of the housing 3 advantageously allows for easy coupling of each axle 7 to one or both of the seat 1 and/or the lid 2. Furthermore, movement of the seat 1 and/or the lid 2 from an up position to a down position, and vice-versa, causes corresponding rotation of the one or more axles 7 (rather than translational movement of the axle 7, allowing for rotary sealing of the axle 7). To that end, the housing 3 may include one or more rotary seals configured to seal around each of the rotating axles 7.

In various embodiments, the axles 7 preferably are translationally fixed relative to one another. However, some other embodiments may include axles 7 that slide up or down relative to one another. The inventors determined that translating axles 7 (e.g., that slide up and down relative to one another) undesirably allow for dust and other particles to get into the housing 3 more easily and stick in the sliding/moving connection. This may decrease the lifetime and performance of the lowering device 52 and/or delaying device 54. The sliding axles 7 are also more difficult to clean and sanitize. Undesirably, the entire slot must be sealed, rather than just the opening for the axles 7. Various embodiments include axles 7 that may rotate relative to one another, but are otherwise translationally fixed. Thus, a system 100 with translationally fixed axles 7 advantageously allows the housing 3 to be sealed while providing rotational coupling with the seat 1 and lid 2.

Furthermore, as shown from the top view of FIG. 2, the footprint 8 of the housing 3 (e.g., the perimeter 8 defined by the top-down view of the housing 3) is within the footprint 9 of the bowl 5 (i.e., does not extend outside of a perimeter 9 formed by the top-down view of the bowl 5). Illustrative embodiments advantageously minimize the size the housing 3 to fit within the footprint 9 of the bowl 5, such that a visual impact of the housing 3 is minimal.

FIG. 3A-3D schematically show the lowering system 100 in a variety of configurations in accordance with illustrative embodiments of the invention. Like many toilets 40, the seat 1 and/or lid 2 are configured to transition from a down position to an up position, and vice-versa (e.g., by rotating about the hinge 46). Generally, for the seat 1, the down position 50 is the position on which the toilet seat 1 is meant to be sat upon by a user, and the up position 48 is the lifted stable position of the toilet seat 1 (e.g., frequently employed when a male user is urinating). Similarly, for the lid 2, the down position 51 is the position at which the lid 2 covers the seat 1 in the down position 50, and the up position 49 is the lifted rested position of the lid 2, often against the toilet tank.

FIG. 3A-3B schematically show the seat down position 50 in accordance with illustrative embodiments. In FIG. 3A, the lid 2 is also in the down position 51. In FIG. 3B, the lid 2 is in the up position 49. Although not shown, another configuration includes the seat 1 in the down position 50 with a toilet 40 without a lid 2. In contrast, FIG. 3C-3D schematically show a seat up position 48. FIG. 3C shows the toilet 40 with no lid 2, whereas FIG. 3D shows the toilet 40 having the lid 2 in the up position 49.

In illustrative embodiments, the down position 50 is a general callout to the location of the seat 1. In the down position 50, the bottom plane of the seat 1 (e.g., the intersection of the surfaces of nubs 16 of seat 1, if the seat has nubs 16, or whichever components first contact the bowl 5) is generally substantially parallel to the top plane of the bowl 5 (e.g., about −15 degrees to about 25 degrees).

In illustrative embodiments, the up position 48 and the down position 50 is a general callout to the location of the seat 1. In the up position 48, the bottom plane of the seat 1 is generally substantially perpendicular to the top plane of the bowl 5 (e.g., about 80-115 degrees from the down position 50). In the down position 50, the bottom plane of the seat 1 is generally substantially horizontal and rests on the bowl 5 directly or indirectly. In a similar manner, the up position 49 of the lid 2 is a general callout to the location of the lid 2. In the up position 49, the bottom plane of the lid 2 is generally substantially perpendicular to the top plane of the bowl 5. In the down position 51, the bottom plane of the lid 2 is generally horizontal and rests on the seat 1. However, the precise position of the seat 1 and the lid 2 in their respective up positions and down positions will vary from toilet to toilet. Those skilled in the art can readily identify the up position and down position of the seat 1 and the lid 2 without being limited to a particular angle or relative fixed position.

In various embodiments, lifting or forcing the toilet seat 1 "towards" the up position 48 may include lifting the toilet seat 1 until the seat 1 reaches the up position 48. In a similar manner, lifting or forcing the lid 2 "towards" the up position 49 may include lifting the lid 2 until the lid 2 reaches the up position 49. In some embodiments, the seat 1 and or the lid 2 may be in the up position 48, 49 (e.g., being held there by delay device 54), the user may reset the delay device by pressing the seat 1 and/or the lid 2 "towards" the up position 48, 49, despite the seat 1 and/or the lid 2 already being in the up position 48, 49. Thus, although the seat 1 may already be positioned in the up position 48, a user may still force/press the seat 1 "towards" the up position 48.

In various embodiments, resetting the time delay may include completely restarting, partially restarting (i.e., setting back the time delay by a number of seconds or minutes), or pausing the time delay (i.e., for the period while the force is applied). In various embodiments, the magnitude of the reset of the time delay may be based on the force applied to the seat 1 or the lid 2, and/or the amount of time that the force is applied to the seat 1 or the lid 2. For example, application of force below a given threshold may partially reset or pause the time delay. In illustrative embodiments where the delay device 54 includes suction cups 13, the material of the suction cups 13 may impact the amount of force used to reset the time delay to varying degrees. However, some embodiments may be configured to easily restart or partially restart the time delay upon the application of a normally applied user force.

In a similar manner, although the lid 2 may already be positioned in the up position 49, a user may still force/press the lid 2 "towards" the up position 49. In some embodiments, the seat 1 may be indirectly lowered by the lowering device 52. For example, the lowering device 52 may operate on the lid 2, which simultaneously pushes the seat 1 to the down position 50. A delay device 54 delays the lowering device 52 from self-lowering the toilet seat 1 towards the down position 50. Additionally, or alternatively, the delay device 54 delays the lowering device 52 from self-lowering the lid 2 towards the down position 51.

Figure 4:
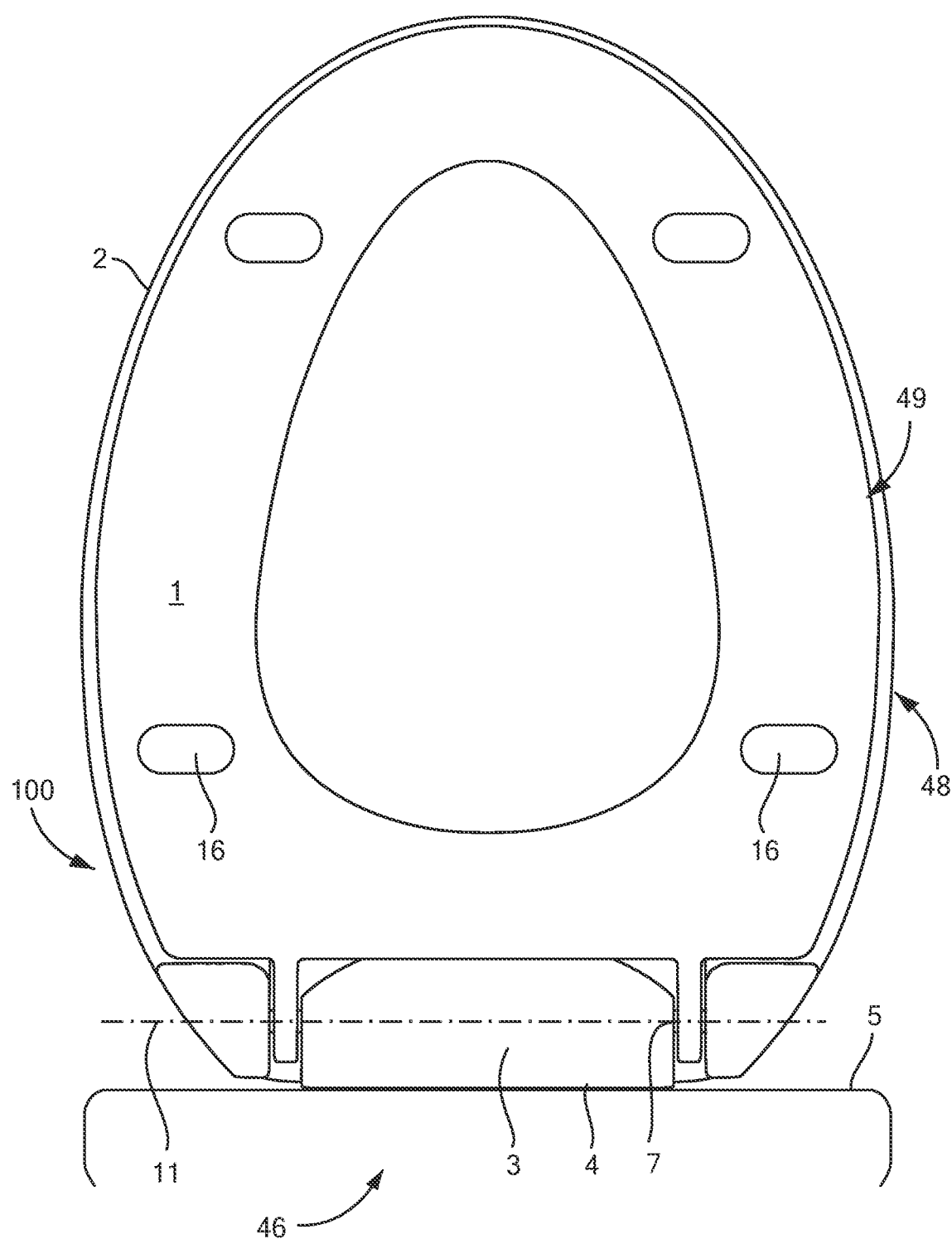
FIG. 4 schematically shows a front view of the toilet seat and the lid both in the up position in accordance with illustrative embodiments.

FIG. 4 schematically shows a front view of the toilet seat 1 and the lid 2 in the up position 48, 49 in accordance with illustrative embodiments. The hinge 46 allows the seat 1 to rotate from the up position 48 to the down position 50 (e.g., where the seat 1 contacts the bowl 5), and to a plurality of positions between the up position 48 and the down position 50, and vice-versa. For example, as discussed further below, some embodiments (e.g., self-lowering) begin the time delay when the seat 1 is user-lifted to the up position 48 and released (i.e., force holding the seat 1 in the up position 48 is removed).

The toilet seat 1 has a contact surface upon which a user sits when the seat 1 is in the down position. In some embodiments, particularly in commercial settings, the seat 1 may have one or more nubs 16 configured to contact the toilet bowl 5. The nubs 16 may be formed of a durable material, either as one piece with the toilet seat 1 or as separate parts later as attached. The nubs 16 are sandwiched between the weight of the user on the toilet seat 1 and the toilet bowl 5. Optionally, the toilet seat 1 may include a handle to assist the user with lifting and/or lowering the seat 1. The hinge 46 couples the toilet seat 1 with the toilet bowl 5 such that the seat 1 is rotatable around a seat axis of rotation 11 defined by a rotating axle 7.

As mentioned above, the hinge 46 includes a substantially dust-proof and/or sealed hinge housing 3. The housing 3 has a base 4, which couples with the toilet bowl 5 (e.g., via bolting). The connection between the hinge housing 3 and housing base 4 is sealed such that ingress of liquids and dust is prevented during normal usage and maintenance of the seat 1. Additionally, the rotary seal also allows for such a seal between hinge housing 3, housing base 4, and the rotating axle 7. Though considered substantially sealed, various embodiments may allow for a small leak of air between interior compartments within the housing 3, such that the air pressure in the hinge housing 3 may equalize to ambient conditions.

In various embodiments, the sealed housing 3 has an IP seal rating with a first digit (protection against solid objects) that is 5 or greater. In other words, the housing 3 is preferably sealed such that it is protected against dust, with a limited ingress. Various embodiments may have a first digit that of 6, i.e., that is totally protected against dust. As dust enters the housing 3, the reliability of the delay system 54 may be undesirably impacted, causing faulty delay timing. Similarly, the sealed housing 3 may have an IP seal rating with a second digit (protection against liquids) that is 1 or greater. Ingress of fluid within the housing 3 is undesirable because, similar to dust and other solid objects, it may impact the reliability of the delay system 54. Various embodiments position the housing 3 within the perimeter 9 of the toilet seat bowl 5. Therefore, it is likely that the housing 3 may encounter fluid (e.g., from the toilet 40, the user, and/or cleaning solutions). Therefore, various embodiments may have an IP level 5.1 seal or greater (e.g., IP seal rating 5.2, 5.3, 5.4, 5.5, 6.1, etc.). Some embodiments may have a higher IP rating (e.g., IP 5.5 or above) to account for commercial use environments, where a high-pressure cleaning system may be used (e.g., to remained sealed against liquid ingress when cleaning with KaiVac® 2750 or other similar high pressure cleaning equipment).

Some embodiments include a vent configured to allow an exchange of air through the housing 3 and ambient external environment (e.g., through a vented bolt used to couple the housing 3 with the bowl 5). Such vent advantageously allows collected water vapor within the housing 3 to evaporate and/or to equalize pressures during shipping or use. The vent is preferably covered by a water repellent screen (such as a self-adhesive GORE® protective vent VE-80205) and/ or configured so that the vent is secreted in an area not subject to direct cleaning or water exposure.

In various embodiments, the housing 3 may be formed of a number of components (e.g., joined together). In some embodiments, the housing 3 may have movable components. The housing 3 provides the seal around the delay device 54 fixedly. In various embodiments, the housing 3 may be a "fixedly sealed housing" 3. In other words, the parts of the housing 3 that form the seal around the delay device 54 do not translate relative to one another. The fixedly sealed housing 3 may include one or more axles 7 that help form the seal. In various embodiments, the one or more axles 7 that form part of the seal may rotate, but not translate, relative to the housing 3. Advantageously, having the fixedly sealed housing 3 provides a robust seal that maintains the integrity of the housing 3 and provides long-lasting operation. Illustrative embodiments having a dynamic housing 3 with components that translate relative to one another undesirably provide opportunity for contaminants and other filth to more quickly break down the operation of the device.

Figure 5A:
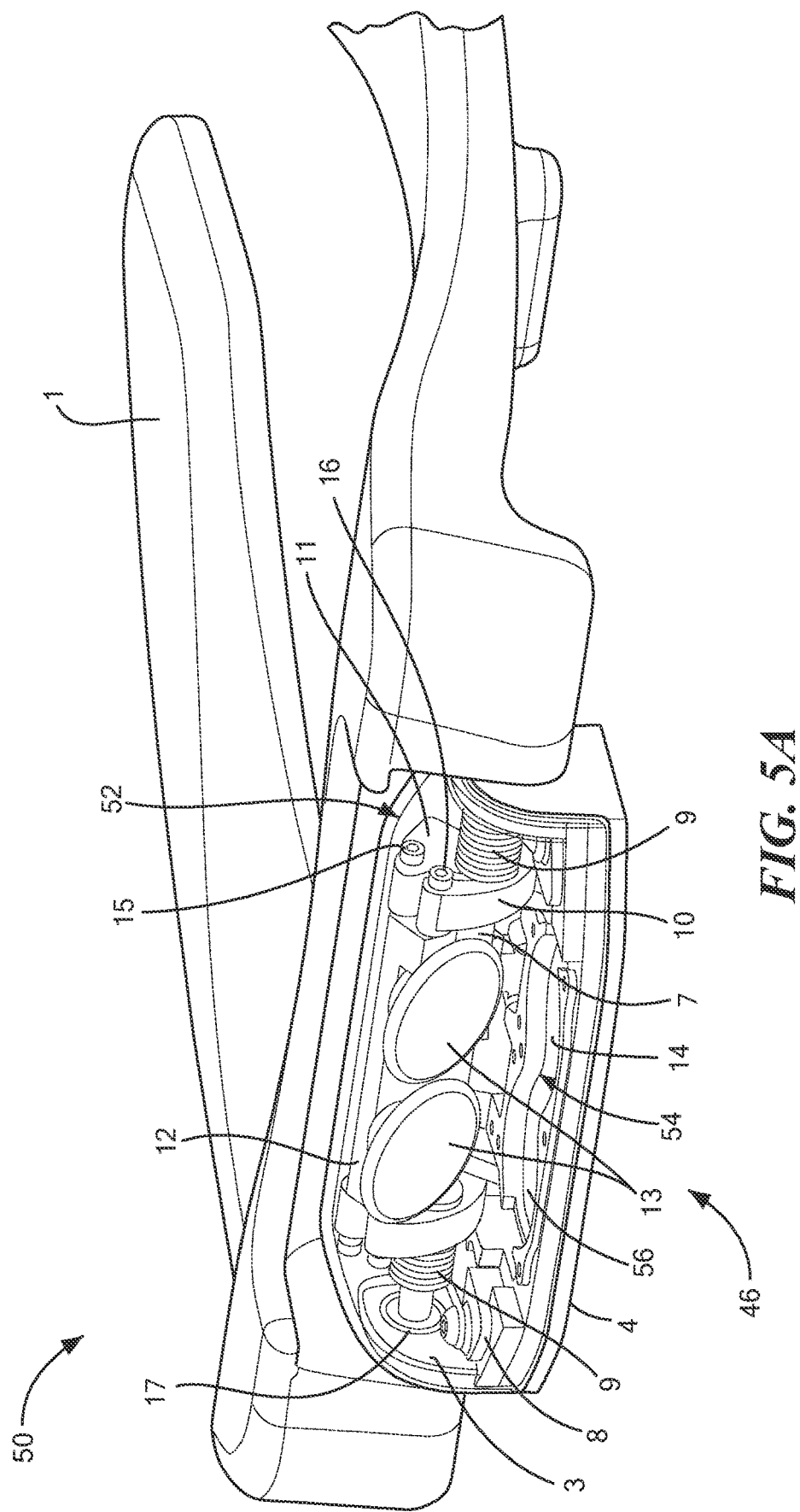
FIGS. 5A-5B schematically show the hinge with a transparent housing in accordance with illustrative embodiments.
Figure 5B:
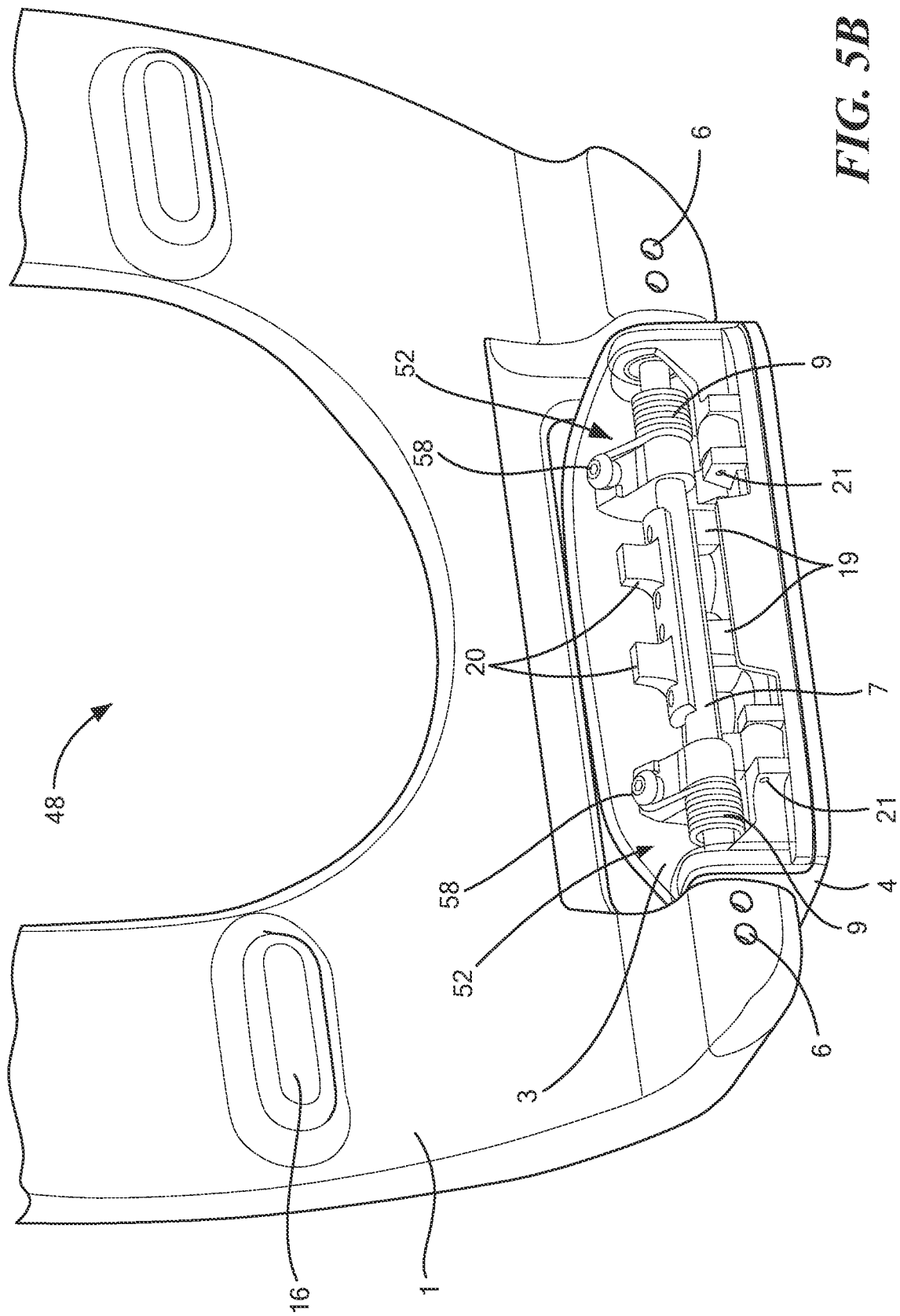

FIGS. 5A-5B schematically show the hinge 46 with a transparent housing 3. In particular, FIG. 5A schematically shows a rear perspective view of the toilet seat 1 in the down position 50. FIG. 5B schematically shows a front perspective view of the toilet seat 1 in the up position 48.

In some embodiments, the self-lowering toilet seat system 100 includes a lowering device 52 configured to self-lower the toilet seat 1 towards the down position 50. In various embodiments, the lowering device 52 may be comprised of a spring 9, such as a torsion spring 9, but may also be comprised of a linear compression or extensions spring, and/or a spiral torsion spring.

Figure 6A:
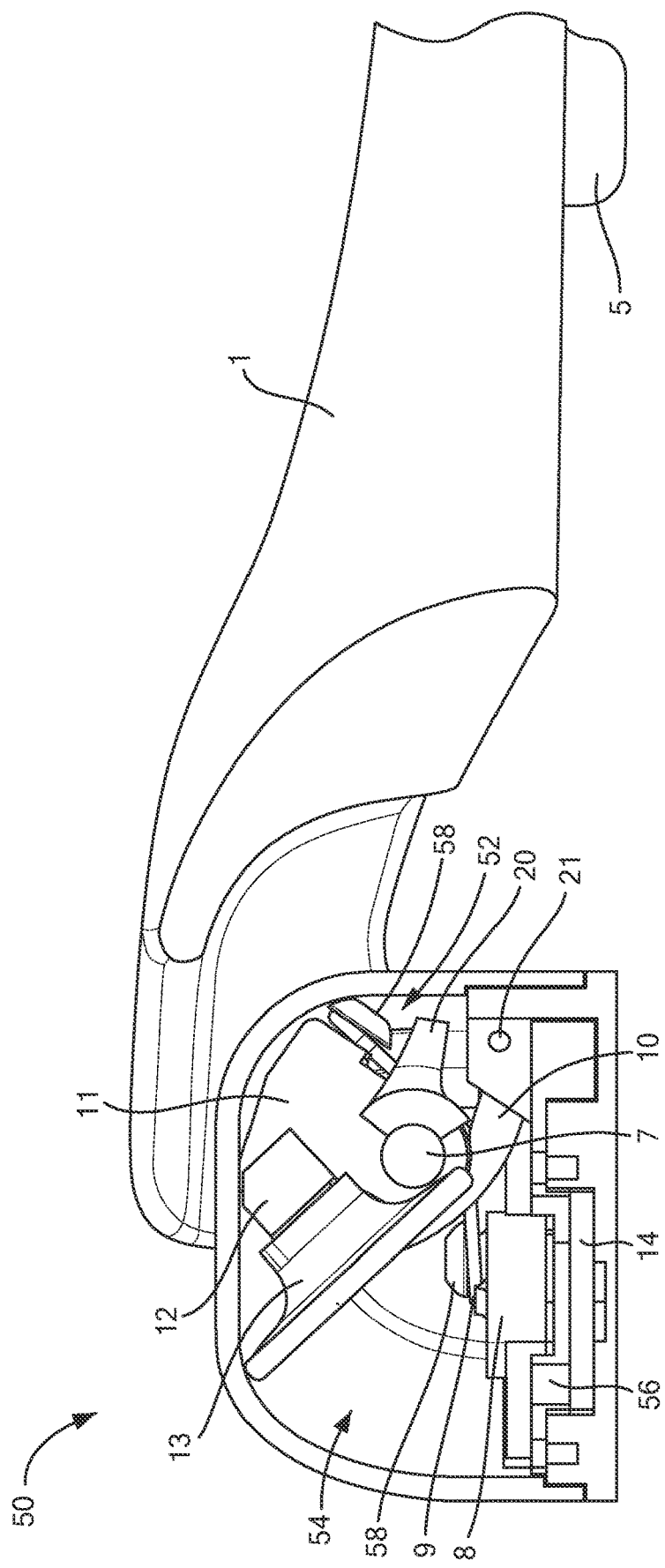
FIG. 6A schematically shows a cutaway side view of the toilet seat of FIG. 5A in the down position in accordance with illustrative embodiments.

As best seen in FIG. 6A, the torsion spring 9 of this configuration may be coupled (e.g., via a first bolt 58) to a fixed spring mount 8. On the other end, the torsion spring 9 couples with an axle link 11 (e.g., via a second bolt 58, best shown in FIG. 6A). The axle link 11 is fixed to the axle 7, and therefore, rotates with the axle 7 when the seat 1 is rotated. Thus, when the seat 1 is user-lifted, the torsion spring 9 is loaded (e.g., via the connection of the axle link 11), and begins to apply a torque in the direction of self-lowering the seat 1 back to the down position 50.

Figure 6B:
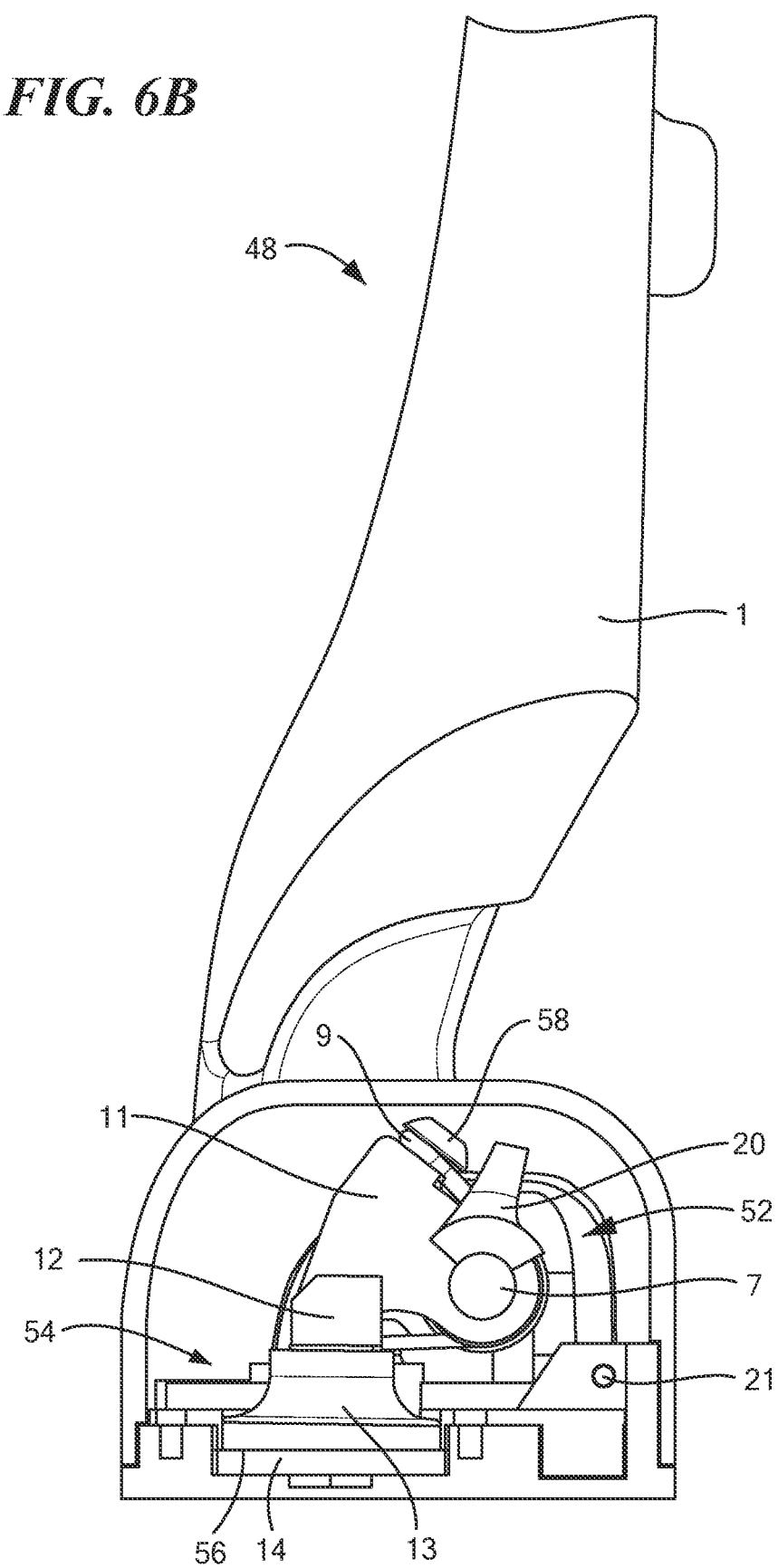
FIG. 6B schematically shows a cutaway side view of the toilet seat of FIG. 5A as it approaches the up position in accordance with illustrative embodiments.
Figure 6C:
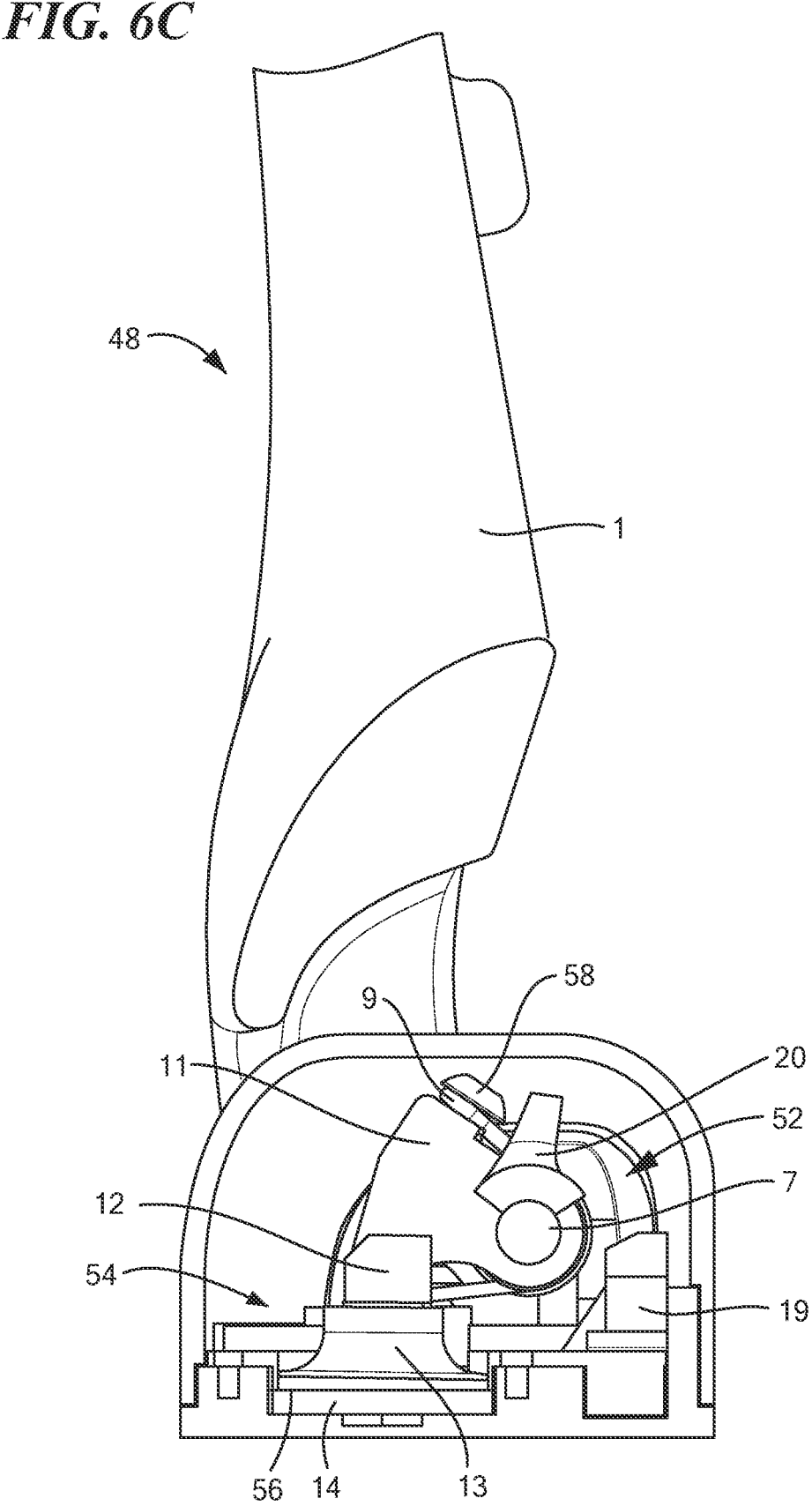
FIG. 6C schematically shows a cutaway side view of the toilet seat of FIG. 5A in the up position in accordance with illustrative embodiments.

FIGS. 6A-6C schematically show a side view of the seat 1 as it is lifted by the user from the down position 50 to the up position 48. In FIG. 6A, the seat is in the down position 50. In FIG. 6B, the seat 1 is nearing the up position 48 but the delay device 54 has not engaged (e.g., the suction cup 13 has not engaged with the plate 14). In FIG. 6C, the seat 1 is in the up position 48.

The axle link 11 is coupled with the axle 7 and with one end of the spring 9. As the seat 1 is user-lifted towards the up position 48, the spring 9 is loaded and applies a counter torque back towards the direction of the unloaded, down position 50. Because the spring 9 is coupled with the axle link 11, the torque of spring 9 is applied to the axle link 11, which relays that torque to the axle 7, and thus to seat 1. Lowering the toilet seat 1 towards the down position 50 may include lowering the toilet seat until the seat 1 reaches the down position 50.

As mentioned previously, it is desirable to provide a delay in the self-lifting of the toilet seat 1. Accordingly, illustrative embodiments provide a delay device 54 configured to delay and/or slow the self-lowering of the toilet seat 1 effectuated by the lowering device 52. Preferably, the delay device 54 provides a sufficient delay to allow the user to get ready to use the toilet 40, as well as finish using the toilet 40. In illustrative embodiments, the delay device 54 delays and/or slows the self-lowering of the toilet seat 1 to the down position 50 for between about 1 second and about 5 minutes.

When the toilet seat 1 is user-lifted to the up position 48 (e.g., by a user who wishes to lift the seat 1), the motion of the seat 1 causes a corresponding motion that engages the delay device 54 (e.g., within the housing 3). For example, as shown in FIGS. 6B and 6C, the delay device 54 is configured such that the suction cup 13 couples to the attachment surface 56 when the toilet seat 1 approaches or reaches the up position 48.

In illustrative embodiments, when the seat approaches the up position 48, the cups 13 contact the attachment surface 56. As the seat 1 comes to the up position 48, the suction cups 13 compress onto the surface 56 and expel the fluid (for example, air or oil) between the cups 13 and the surface 56. This creates a pressure imbalance such that when the seat 1 experiences a torque from the lowering device 52 that biases the seat 1 towards the down position 50, the cups 13 use that pressure imbalance to "stick" to the surface 56 and delay the self-lowering of the seat 1.

In various embodiments, the delay of the self-lowering of the seat 1 by the delay device 54 is created by integrating a controlled leakage channel 18 (discussed in further detail below) into cup 13 or plate 14 to allow for a slow leak of fluid back into the cup 13. Due to the force separating the cup 13 and plate 14 that is translated from the lowering device 52 to the delay device 54 through the linkage components 10,11, and 12, (as well as the elastomeric memory of the suction cup) fluid is forced to leak into the cup 13. After enough fluid has entered so as to substantially equalize the internal and external cup 13 pressures, the cup 13 and the plate 14 are easily separable. Carefully controlling this flow back into the cup 13 allows for an adjustable delay device 54 to be created such that when enough fluid has re-entered the cup 13 to equalize the pressure, the cup 13 no longer has any holding power and the springs 9 simply self-lower the seat 1 back into the down position 50. When this happens, the cups 13 are driven back to their starting position through the linkage. Thus, the cups 13 coupled with plate 14 act as a delay device 54, and the toilet seat 1 does not immediately self-lower after a user removes their lifting force, giving the user time to finish using the toilet before the delay expires.

Advantageously, the pressure differential-based force that holds the cup 13 down to plate 14 allows for a user to self-lower the seat 1 to the down position 50 at any time during the duration of the delay device 54. If the force that is translated to the delay device 54 by the user's exerted force on the seat 1 is larger than the holding force of cup 13 onto plate 14, then the delay device 54 disengages and allows the user to self-lower the seat to the down position 50. Thus, the user easily overcomes the holding force of the cup 13 on the plate 14 with relative ease because of the significantly longer lever arm that the user has at the tip of the seat 1, compared to the relatively short lever arm of the cup 13 inside the hinge 46. Additionally, the elasticity of the cup 13 means that the cup 13 is able to easily disengage from plate 14 under the relatively low lowering force from the user, thereby not causing any injury to the user, or damage to the seat and internal linkage components (discussed below).

The suction cup 13 may be mounted relative to the axle 7 such that rotary motion from the toilet seat 1 is relayed through the axle 7 to the suction cup 13. Although the suction cup 13 is shown as engaging the plate 14 when the toilet seat 1 is near the up position 48, it should be understood that the position and/or dimensions of the plate 14, as well as the internal linkages (e.g., 10, 11, 12), position, and size of the suction cup 13 may be tuned to engage at any point along the transition of the seat 1 from the down position 50 to the up position 48.

The axle link 11 may be coupled to an interlink 12 (e.g., through rotary link 15) that is fixed to the delay device 54 (e.g., suction cup 13 and plate 14), as discussed further below. Thus, movement of the toilet seat 1 may be relayed through the axle 7 and various links (e.g., 10, 11, 12, etc.) to the delay device 54. In some embodiments, a second link 10 is coupled to the interlink 12 (e.g., through rotary link 16) to maintain a desirable orientation of the delay device 54.

Furthermore, some embodiments may include a linkage (e.g., 10, 11, 12) to transfer the rotational motion of the seat 1 to the suction cup 13, as a suction cup may function most effectively when it is travels linearly and is applied normally to a contact surface, such as the surface 56 of timing plate 14. The linkage may be comprised of a driving link 11 (also referred to as the axle link) and a secondary link 10 rotatably affixed to pivot point 21. These two links may be rotatably affixed to another intermediate link 12 via rotatable connection points 15 and 16, thus forming a four-bar linkage. Such a configuration is advantageous as the suction cup 13 may be fixed to the intermediate link 12 so as to achieve a substantially perpendicular motion of the suction cup 13 relative to the plate surface 56 as the seat 1 moves into the down position 50 and contacts the timing plate 14, but rotation of the cup 13 when the seat 1 is in any other position. This allows for a compact design of case 3 and a robust, low-friction coupling between the suction cup 13 and plate 14.

Figure 7A:
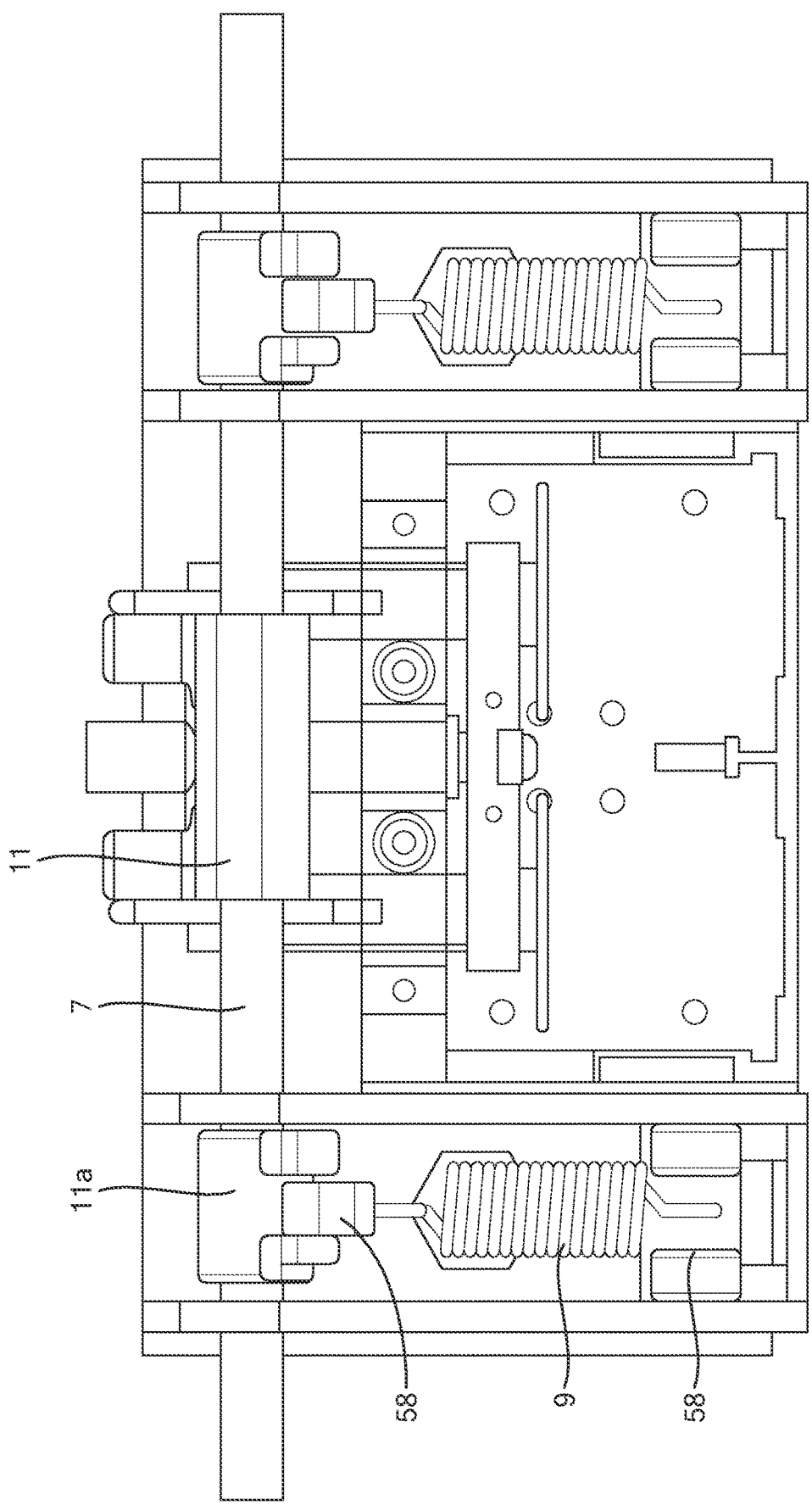
FIG. 7A schematically shows a top view of a self-lifting device and delay device in accordance with illustrative embodiments.
Figure 7B:
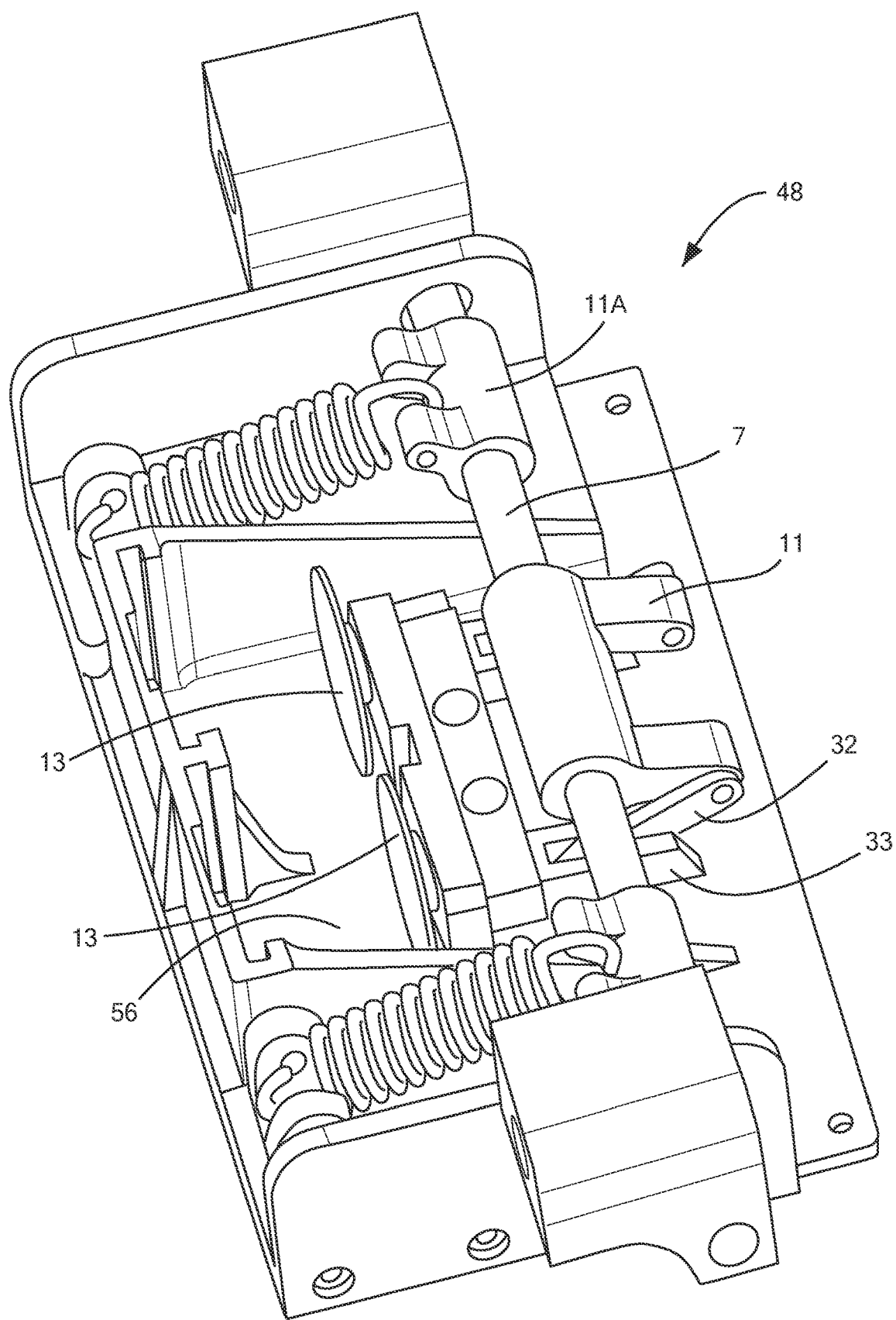
FIGS. 7B-C schematically show a perspective view of the device of FIG. 7A when the seat is in the down position and up position, respectively.
Figure 7C:
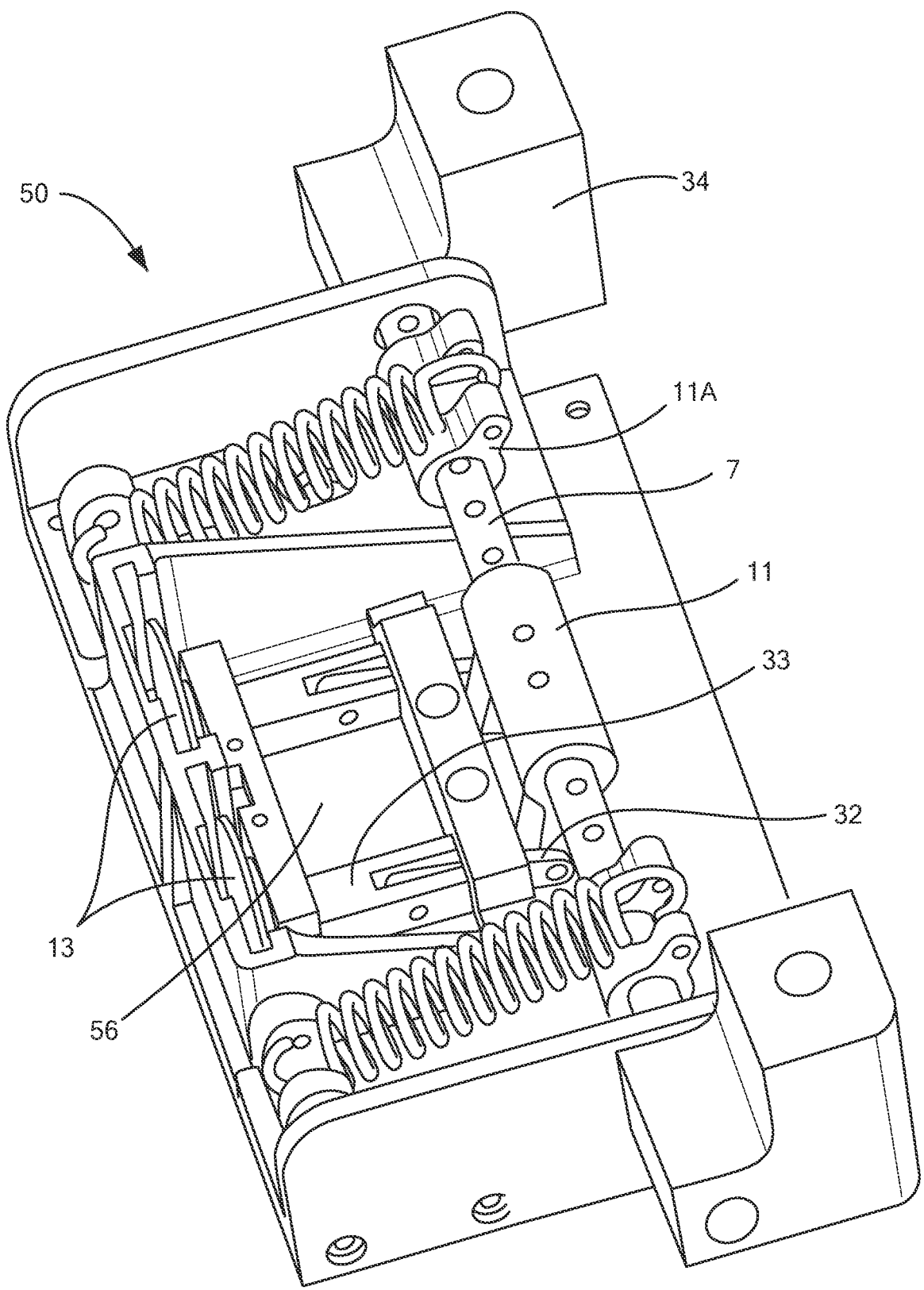

In alternative embodiments, the seat 1 remains fixed to the rotating axle 7 shaft at the housing base of the seat 1. As seen in FIG. 7A, the axle 7 translates the rotary motion of the seat 1 to axle link 11 that is rotatably fixed to the axle 7. As seen in FIGS. 7B and 7C, the axle link 11 in turn drives the link 32, which in turn drives link 33, onto which the delay device 54 is mounted. Link 33 is constrained to travel linearly, and thus, in some embodiments, the linkage shown in FIGS. 7A-7C convert the rotational motion of the seat 1 into linear motion (e.g., similar to linear piston actuation).

Figure 7D:
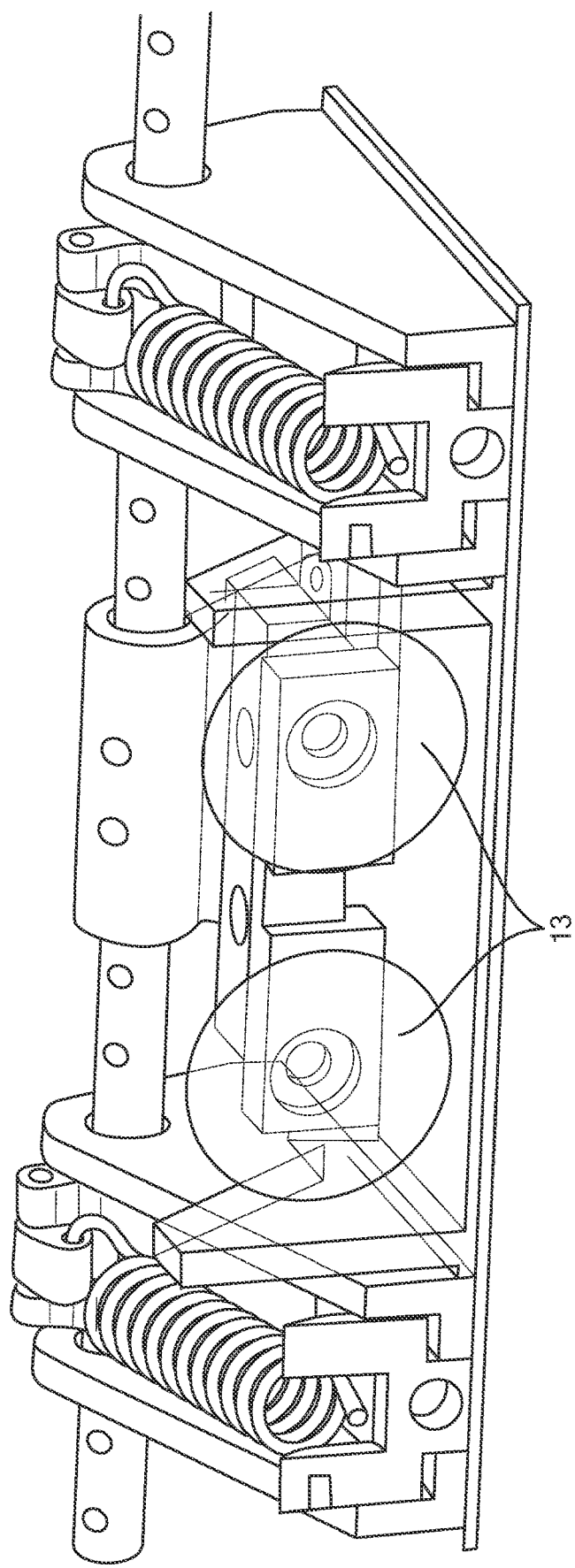
FIG. 7D schematically shows a perspective detailed view of the delay system of the device of FIG. 7A.

FIGS. 7B-7C schematically show a perspective view of the device of FIG. 7A. FIG. 7D schematically shows a rear perspective view of the device of FIG. 7A. In FIG. 7B, the delay device 54 is disengaged. In FIG. 7C, the delay device 54 is engaged (also referred to as triggered). When the seat 1 is lifted, the axle link 11, via pinned links 32 and 33, moves the cups 13 through a fluid medium relatively unimpeded, until the seat 1 approaches or reaches the up position 48.

Figure 8A:
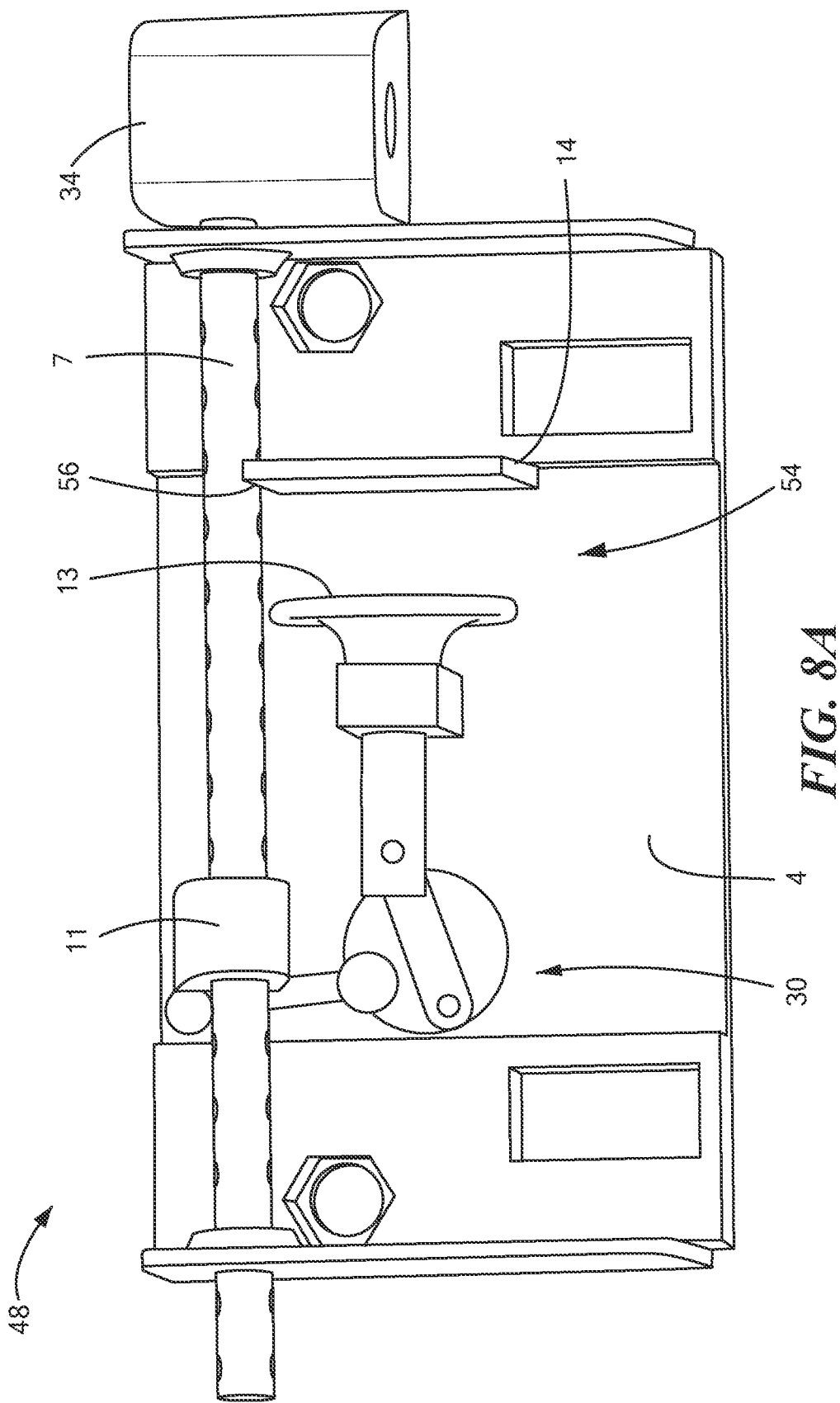
FIGS. 8A-8B schematically show an alternative embodiment of the delay device when the seat is in the down position and up position, respectively.
Figure 8B:
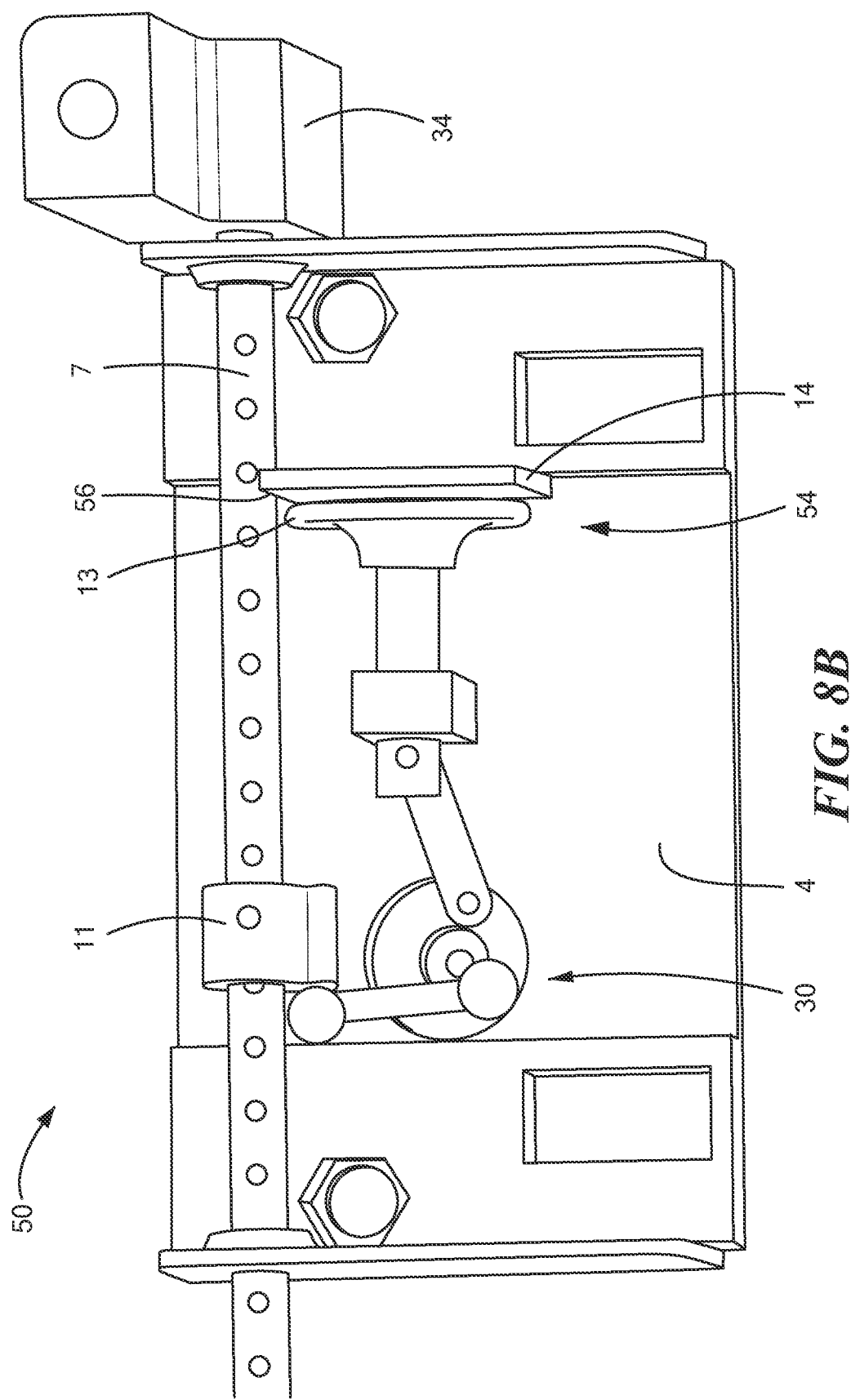
Figure 9:
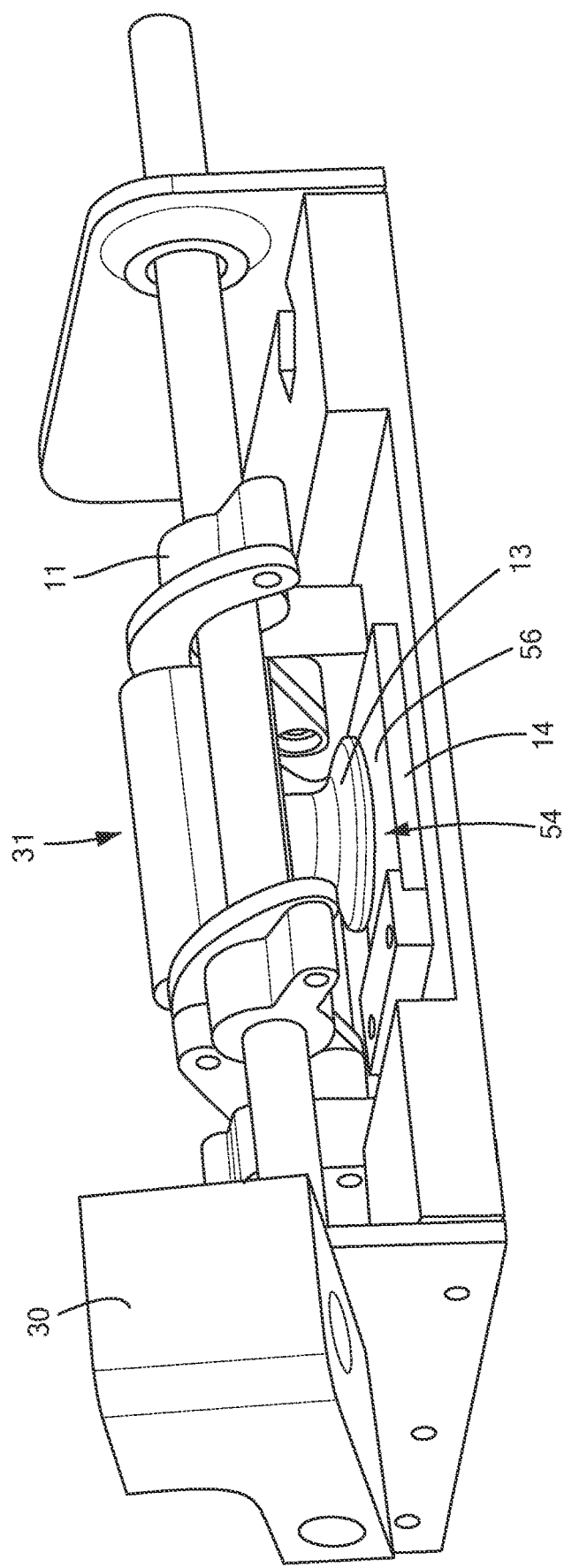
FIG. 9 schematically shows the delay device in accordance with illustrative embodiments.

Other linkages, such as a plane change linkage 30 as shown in FIGS. 8A and 8B, a six-bar linkage 31 as shown in FIG. 9, and others such as a barrel cam linkage, rack and pinion style linkage, etc. are other embodiments of this motion translation system which allow for linear, or substantially linear motion of the suction cup as the cup 13 approaches and contacts the plate 14. In some other embodiments, there is a direct linkage between the seat 1 and delay device 54, wherein the suction cup 13 is affixed directly to the axle link 11. Accordingly, the delay device 54 may have a non-normal pull off force due to the rotation of the seat 1, and therefore cup 13. Though this may advantageously simplify the linkage, a taller housing is undesirably required to accommodate the end effector 13 of the delay device 54 rotating a full 90 degrees or more with the seat. Undesirably, the non-normal force may also distort the shape of the suction cup, causing an unpredictable/inconsistent timing delay.

In various embodiments, the delay device 54 may include one or more suction cups 13 configured to couple with a timing plate 14 having a contact surface 56. In various embodiments, the shape, hardness, and/or positioning of the suction cup 13 is configured in conjunction with the size and placement of the fluid leakage channels 18 to provide the desired time delay. Specifically, when the suction cup 13 disengages from the contact surface 56, the seat 1 begins to self-lower due to the torque from the lowering device 52 (e.g., including gravity). Preferably, both the contact surface 56 and the suction cup 13 are kept clean of surface contaminants to allow for consistency in the time delay. For example, waste and/or dust on either the contact surface 56 or the suction cup 13 causes an unreliable and/or premature time delay. Thus, various embodiments seal the contact surface 56 and/or the suction cup 13 within a dust-proof housing 3 via rotary seals 17.

However, as discussed further below, the suction cup 13 and/or the timing plate 14 may include one or more controlled leakage channels 18. In some embodiments, the controlled leakage channel 18 may be integrated into the suction cup 13 by using a material with a known and appropriate bulk porosity. In the same manner, the timing plate 14 can itself function as the controlled leakage channel 18 when the material used for the plate 14 has an appropriate bulk porosity. The controlled leakage channels 18 may also be covered by an additional filter or other flow reduction material (such as POREX® Porous PTFE material). Depending on the method of manufacture, the controlled leakage channels 18 may be too large to achieve the desired time delay. Accordingly, illustrative embodiments may thus pro-vide the flow reduction material in or over the leakage channel 18 to restrict the rate of airflow through the channel 18. In various embodiments, to provide an appropriate time delay range, the flow reduction material may be configured to provide an airflow rate of between about 0.01 L/hr/cm^2 at a pressure differential (deltaP) of 70 mbar to about 50 L/hr/cm^2 at deltaP of 70 mbar. More particularly, the flow reduction material may be configured to provide an airflow rate of between about 0.05 L/hr/cm^2 at deltaP of 70 mbar to about 0.1 L/hr/cm^2 at deltaP of 70 mbar.

Figure 10A:
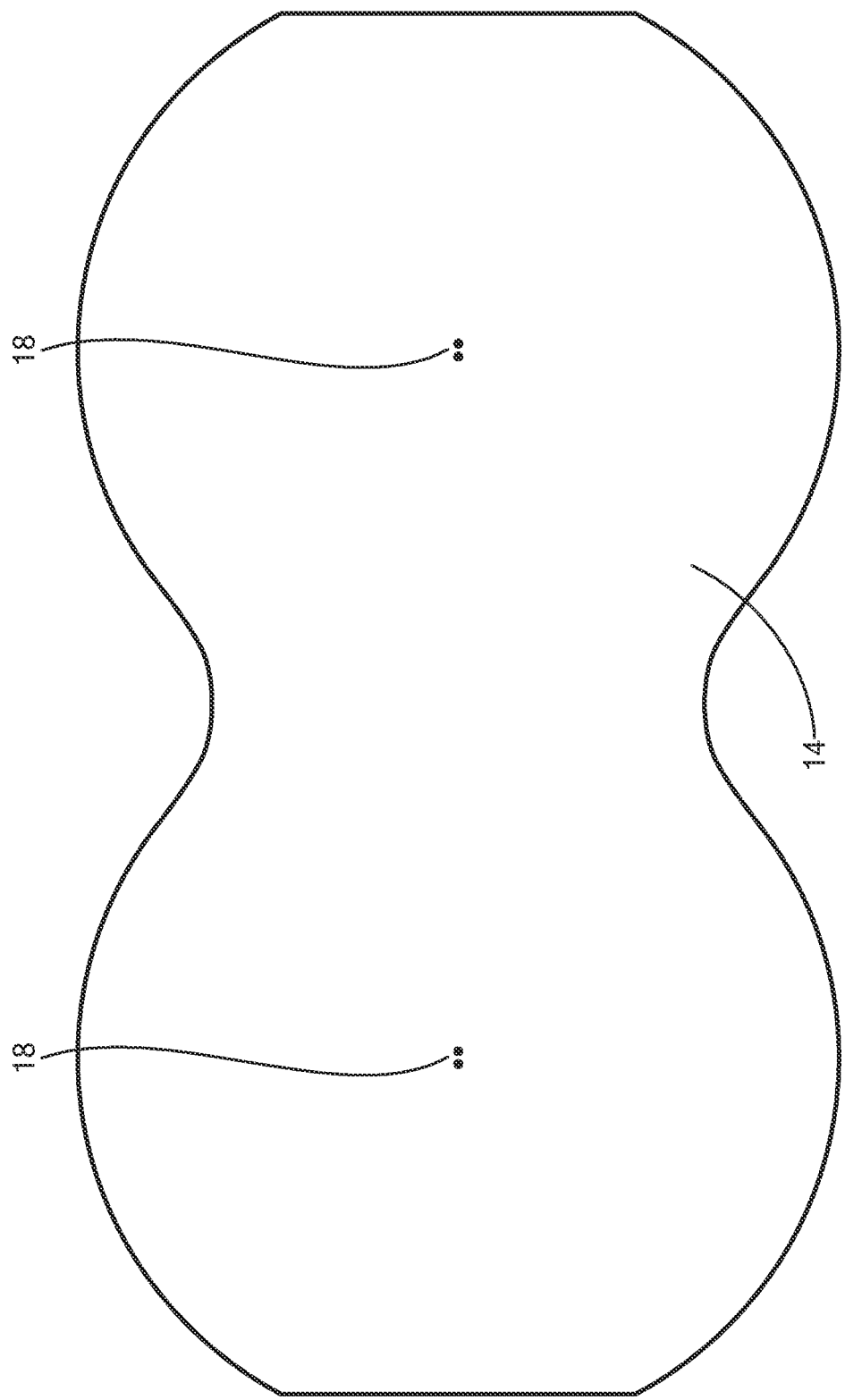
FIG. 10A schematically shows the timing plate in accordance with illustrative embodiments.
Figure 10C:
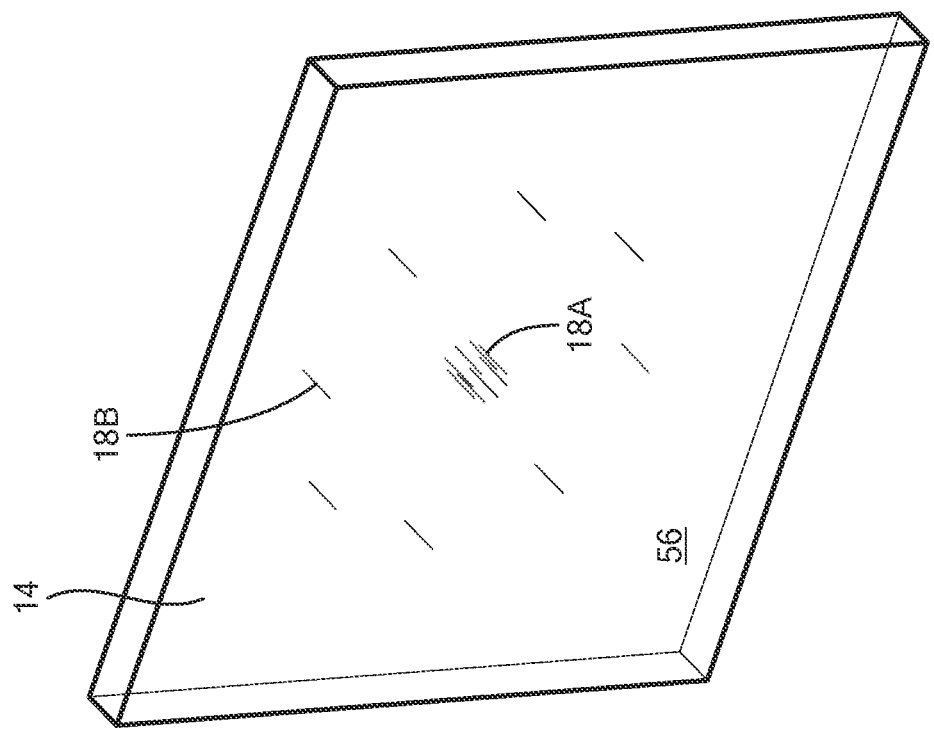
FIGS. 10B-10C schematically show the timing plate with quick release channels in accordance with illustrative embodiments.
Figure 10B:
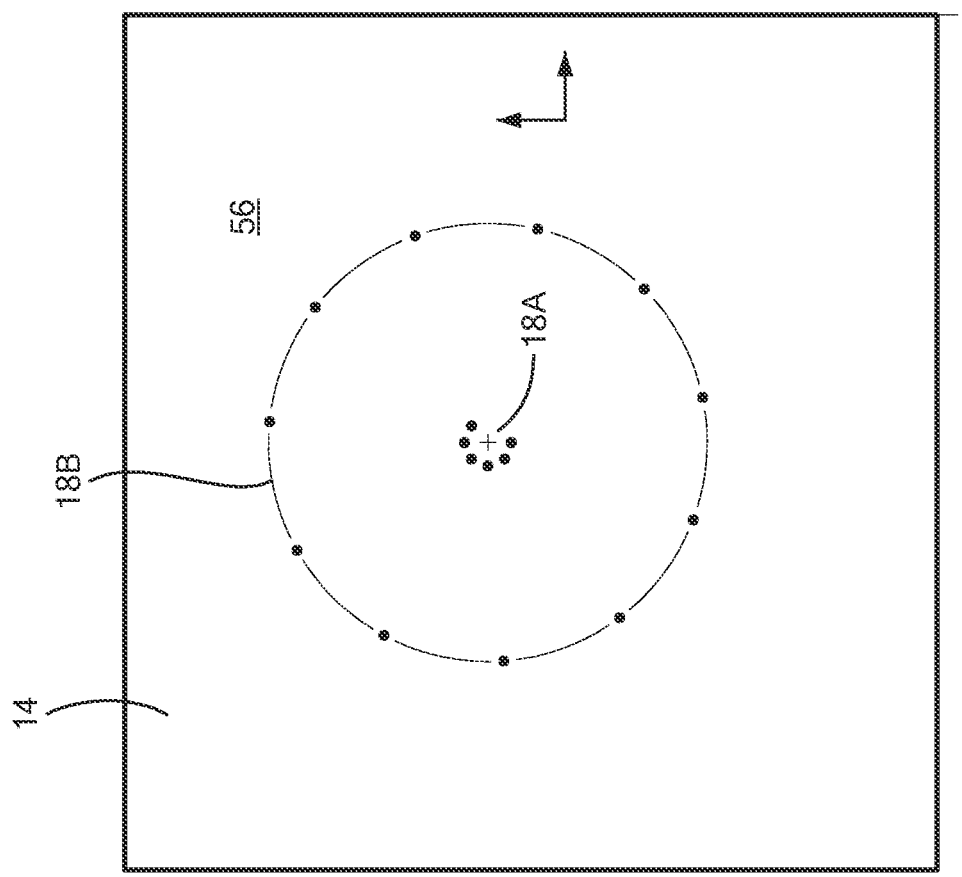
Figure 10D:
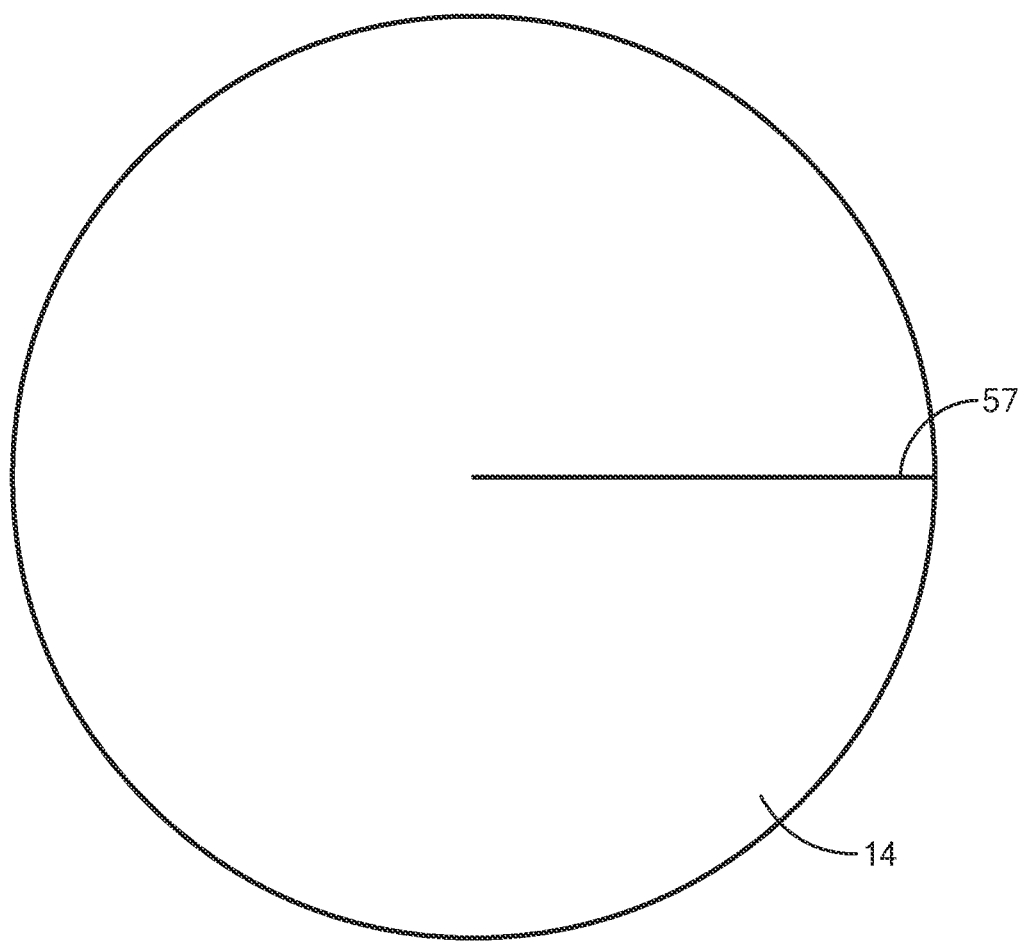
FIG. 10D schematically shows the timing plate with a groove in accordance with illustrative embodiments.

In other embodiments, as shown in FIG. 10D, the plate 14 may include a groove 57, such that when the suction cup 13 is in contact with the plate 14, the groove 57 spans the distance between the inside and outside of the cup 13, allowing a controlled amount of fluid to flow into the cup and function as the controlled leakage channel 18. Such a configuration is advantageously simple from a mass manufacturing perspective as the plate 14 may be integrated directly into the housing base 4. In further embodiments, the plate 14 or cup 13 may be coated with an adhesive substance, such that when the suction cup 13 contacts the plate 14, it adheres to it using temporary 10) adhesive forces. In such an embodiment, the cup 13 may consist of a rigid material.

FIG. 10A schematically shows the timing plate 14 in accordance with illustrative embodiments. In some embodiments, the timing plate 14 has a smooth surface 56 to ensure a strong seal between the cup 13 and the surface 56. Various embodiments may form the plate 14 or the surface 56 from, for example, a smooth, glossy plastic. Some other embodiments may form the plate 14 or the surface 56 from an acrylic, HDPE, Teflon, glass and/or or polished metal.

As mentioned previously, the timing plate 14 may include one or more controlled leakage channels 18. The controlled leakage channels 18 may include one or more small holes/vias in the plate 14 that are configured to allow a slow and controlled flow of fluid (e.g., air, viscous oil) between the cup 13 and the plate 14 when cup 13 is engaged with plate 14. Placing these controlled leakage channels 18 in the plate 14 such that they align with the center of the cup 13 allows for fluid to be constantly drawn back into the cup 13 as the linkage pulls on the cup 13 via the lowering springs 9. Preferably, various embodiments use several holes of diameter 0.1 mm-0.5 mm to achieve a preferred timing range of 5 seconds-45 seconds, however some embodiments may have larger holes (e.g., >0.5 mm diameter) which advantageously reduce the likelihood that the controlled leakage channels 18 are clogged by dust particles or other contaminants. Additionally, or alternatively, the controlled leakage into the cup may travel via the attachment surface 56, wherein the attachment surface 56 may include a groove 57, porous material, and/or textured material.

To assist with preventing dust particles from passing through the controlled leakage channels 18, as well as assist in reducing the fluid flow through the controlled leakage channels, some embodiments may include a filter over the controlled leakage channels 18. Examples of filter materials include Tyvek, sintered Teflon powder such as Porex, densely woven fabrics and vapor permeable air barrier tapes. The diameter of the channels 18 as well as the filter permeability strongly influence timing. While a hole/filter arrangement is advantageous for the delay device, other methods to induce a controlled flow through the controlled leakage channels for controlling the delay device 54 include a needle valve, textured surface, porous surface 56, porous suction cup 13, etc.

FIGS. 10B-10C schematically show another embodiment of the plate 14 in accordance with illustrative embodiments. The plate 14 may include quick release channels 18B at a designated distance from the controlled leakage channels 18A. Since the suction cups 13 stick to the plate 14 due to a pressure imbalance as well as adhesive stiction, it can be difficult to control the exact point of release of the cups 13. When the is about to expire, the cup 13 may be holding on to plate 14 by only its outermost rim. At this point, the release point uncertainty may be high. To avoid dealing with this uncertainty, quick release channels 18B may be added to the plate 14 at a particular radial distance away from controlled leakage channels 18A. When the cup 13 is first compressed, these holes 18B are covered by the cup 13 material and are therefore not able to transmit any fluid into the cup 13. However, when the cup 13 deflects to a certain level after enough fluid has flown in through the controlled leakage channels 18A, the quick release channels 18B (optionally covered by a filter) are connected to the fluid pooling in the center of the cup 13. The quick release channels 18B allow for a large flow rate and substantially instantly allow enough flow so as to equalize pressure and quickly release the cup 13.

In various embodiments, characteristics of the cup 13 can negate the issues presented by the uncertain release point seen in non-ideal cups 13. Various embodiments may use flat cups 13 with low nominal deflection. It should also be noted that the cups 13 and the linkage(s) move through room temperature air in various embodiments. However, some embodiments provide a new ambient fluid, such as viscous oil. Accordingly, the controlled leakage channel 18 size needed to achieve the same flow rate as with air becomes much larger, while the suction cup 13 elastomer is protected from oxidation. This also advantageously addresses issues like dust clogging the system. Additionally, if the cups 13 are mounted on the end of a piston actuating through a cylinder filled with oil, a circular plate 14 can be affixed to the piston, with an outer diameter similar to that of the inner diameter of the cylinder. Doing so creates a damping effect that eliminates any potential slamming of the seat 1 on the way to the down position 50 (e.g., by the lowering device 52) and further may eliminate the need for an additional damper component (e.g., damper 19).

It should be appreciated that various embodiments may provide a passive lowering device 52 and/or delay device 54.

The biasing system 52 and/or delay device 54 may operate without the use of electrically powered components. Thus, the lowering device 52 and/or delay device 54 advantageously operate without the need for an electrical power connection or changing of batteries. The lowering device 52 and/or delay device 54 therefore reduce the need for maintenance, and additionally, allows for use in toilets 40 that are not near to an electrical connection (e.g., portable toilets). Furthermore, illustrative embodiments provide a single action for initiating the lowering device 52 and the delay device 54 (e.g., lowering the toilet seat 1).

Figure 11:
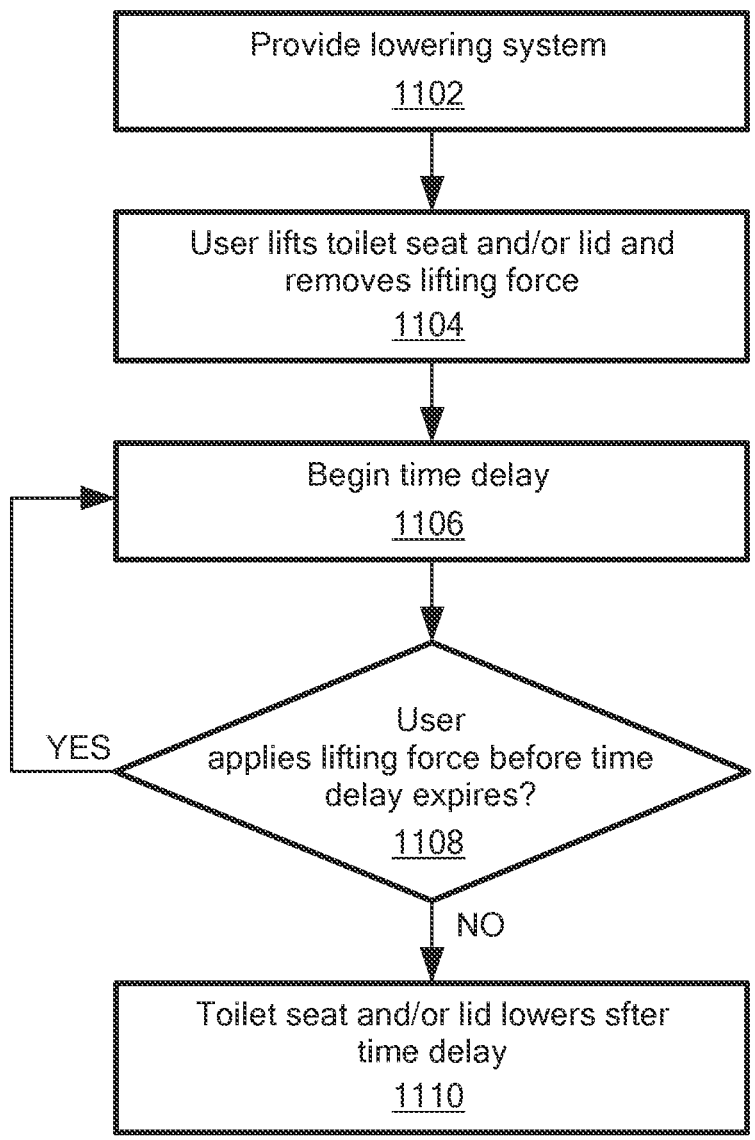
FIG. 11 shows a method of self-lowering a toilet seat in accordance with illustrative embodiments of the invention.
Figure 12A:
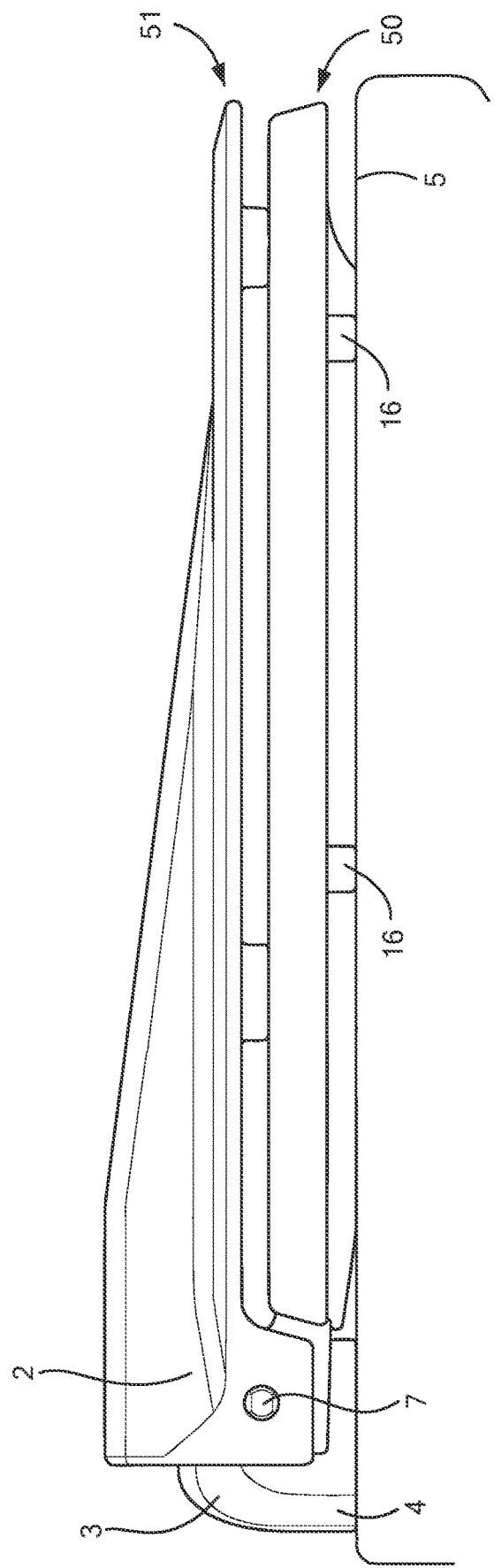

FIG. 11 shows a process of self-lowering the toilet seat 1 and/or lid 2 in accordance with illustrative embodiments of the invention. The process begins at step 1102, which provides the self-lowering toilet seat system 100 as described herein. FIG. 12A shows the toilet seat system 100 with the seat 1 and the lid 2 in the down position 50, 51. In general, the self-lowering toilet seat system 100 may be provided as described elsewhere in the application. For example, the self-lowering system 100 may include the seat 1, the lid 2, and the hinge 46 that rotationally couples the seat 1 and/or lid 2 to the toilet bowl 5. Sealed within the housing 3 is a lowering device 52 and a delay device 54. The lowering device 52 may act directly on the seat 1, directly on the lid 2, and/or directly on both the seat 1 and the lid 2. As discussed further below, a plurality of lowering devices 52 and/or delay devices 54 may be sealed within the housing 3 (e.g., one set for the seat 1 and a second set for the lid 2).

In various embodiments, the toilet seat system 100 includes the toilet seat 1, the lid 2, the toilet bowl 5, and the hinge 46. However, some embodiments may omit the lid 2. Generally, the toilet bowl 5 is already installed at a desired location. Therefore, the system 100 may include the toilet seat 1 and the hinge 46, which may be retrofitted to couple with the toilet bowl 5. In various embodiments, the hinge 46 (e.g., the housing 3 and housing base 4) may be configured to bolt or otherwise couple with the toilet bowl 5. As discussed below, the hinge 46 also couples to the seat 1 and preferably allows the seat 1 and lid 2 to move and/or rotate relative to the bowl 5.

The self-lowering toilet seat system 100 includes the lowering device 52 configured to self-lower the seat 1 towards the down position 50. The system 100 also includes a delay device 54 configured to delay the lowering device 52 from self-lowering the toilet seat 1 to the down position 50. Preferably, the delay device 54 and/or the lowering device 52 are positioned within the sealed hinge housing 3 and housing base 4. For example, this prevents or reduces the amount of contamination, grime, waste (e.g., urine), and/or dust that may accumulate between a suction cup 13 of the delay device 54 and the attachment surface 56. This advantageously allows the delay device 54 to operate more reliably and to require reduced maintenance of components relative to an unsealed delay device 54.

In some embodiments, the self-lowering toilet seat system 100 includes the lowering device 52 configured to self-lower the toilet seat 1 towards the down position 50. In various embodiments, the lowering device 52 may be comprised of a spring 9, such as a torsion spring 9, but may also be comprised of a linear compression or extensions spring, and/or a spiral torsion spring.

Figure 13:
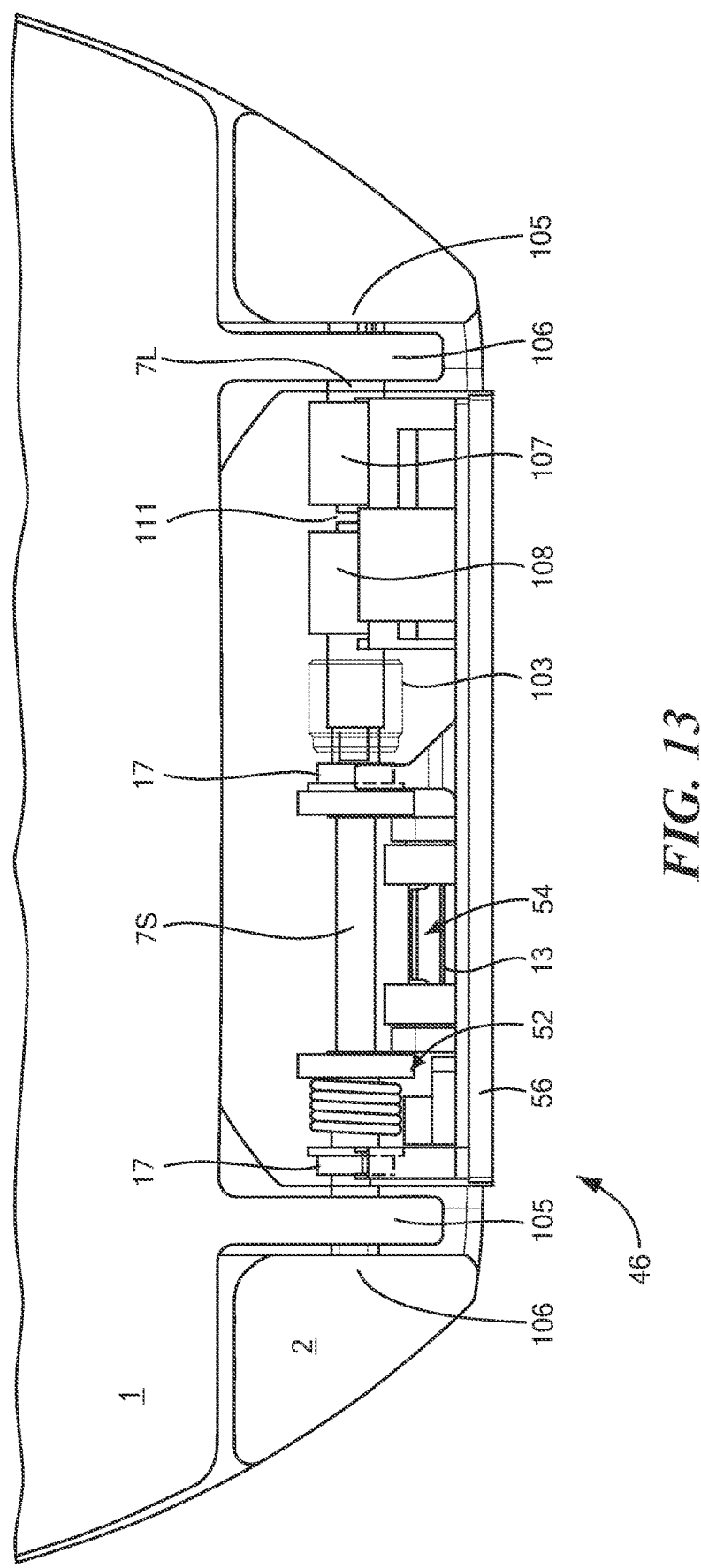
FIG. 13 schematically shows a transparent housing showing details of the toilet seat lowering system in accordance with illustrative embodiments.

FIG. 13 schematically shows a transparent housing 3 showing details of the toilet seat lowering system 100 in accordance with illustrative embodiments. In particular, FIG. 13 schematically shows a front view of the toilet seat 1 in the up position 48 (similar to FIG. 4). The lid 2 is also shown in the up position 49.

As best shown in FIG. 13, to achieve the proper mounting of both lid 2 and seat 1 about the hinge 46, the seat 1 is coupled to the axle 7S via fixed connection point 105. In some embodiments, the axle 7S rotates about a hinge bearing 17 and directly translates the rotating motion of the seat 1 to the lowering device 52 and delay device 54. The axle 7S is then supported via a secondary hinge bearing 17 and then couples to seat damper 108. The lid 2 is coupled to the axle 7L via fixed connection point 105. As shown in FIG. 13, the axle 7L comprises the output shaft of lid damper 107.

It is also advantageous to include one or more slow-close dampers for both the seat 1 and the lid 2 in order to avoid slamming into the bowl 5 as they lower. FIG. 13 shows a configuration of two dampers working in tandem with the lowering device. Damper 108 is affixed to the fixed housing 3 and mounted to the axle via a connector piece 103. Thus, the damper 108 translates a damping force to the seat via axle 7 and fixed connection 105. Damper 107 is also affixed to housing 3 and then passes through seat 1 via free rotating connection 106. The damper 107 further extends into the lid 2 via fixed connection 105. The seat axle 7S and lid axle 7L are separated by a gap 111 to form two independently rotating axle sections.

Figure 14:
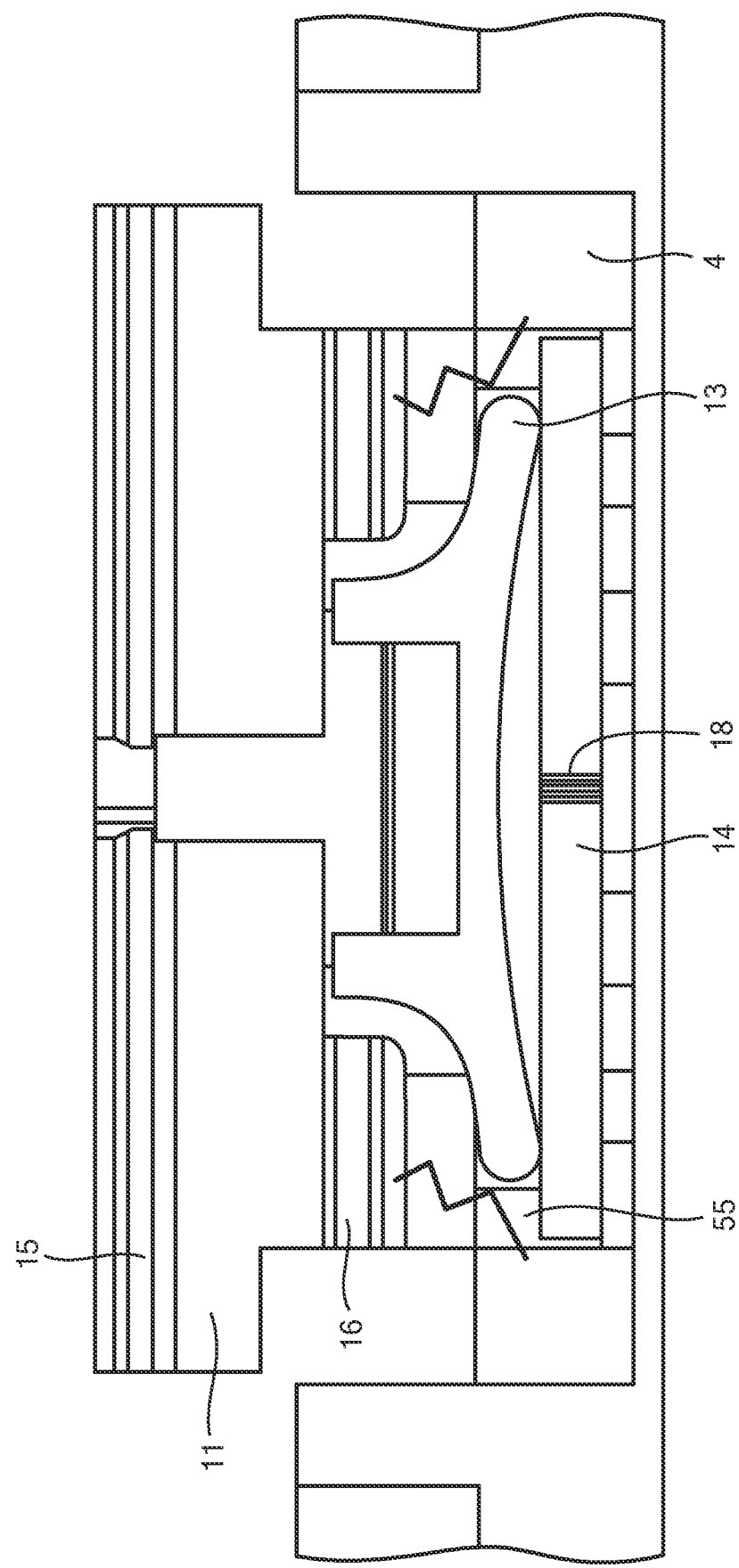
FIG. 14 schematically shows details of the delay device in accordance with illustrative embodiments.

Inside of the housing 3 is the delay device 54. Additionally, the housing 3 and housing base 4 may contain the lowering device 52 and the linkages. In some embodiments, as shown in FIG. 14, the cup 13 and the plate 14 are further isolated within this housing 3 using a bellows 55 or other seal that encloses the plate 14 and cup 13 in a fully dustproof manner while continuing to allow the full range of motion of the suction cup 13.

Figure 12B:
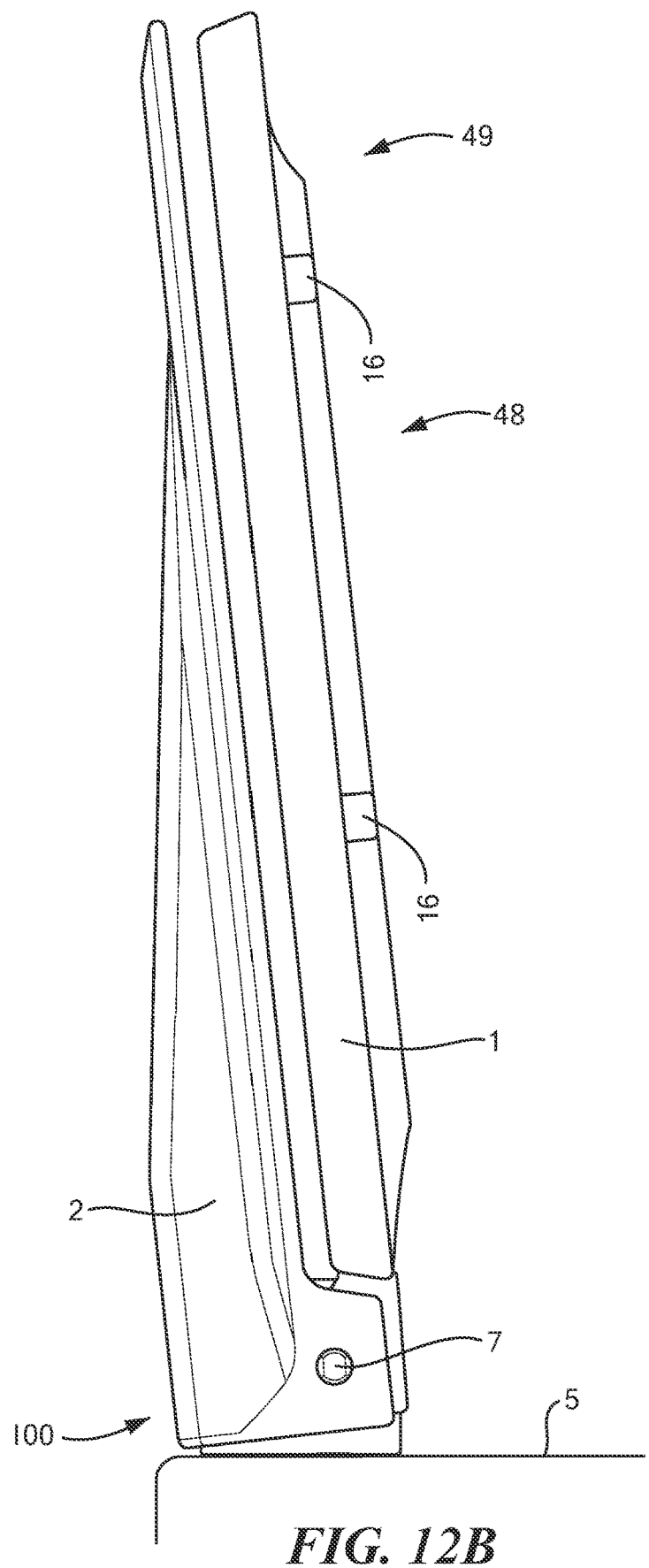

At step 1104, the user lifts the toilet seat 1. FIG. 12B schematically shows the toilet seat 1 lifted to the up position 48. In illustrative embodiments having the lid 2, the lid 2 is lifted prior to the seat or by the lifting force applied to the seat 1. Alternatively, some embodiments may omit the lid 2 altogether. When the toilet seat 1 is user-lifted, the lowering device 52 begins to provide a counter torque to the seat 1 towards the down position 50. At some point during the lifting of the seat 1, preferably when the seat approaches the up position 48, the delay device 54 engages, causing the toilet seat 1 to remain in the up position 48 until the user removes their applied force from the seat 1.

The process then proceeds to step 1106, which begins the time delay once the user's applied lifting force is removed. When the user applied lifting force is removed, the time delay 54 begins. As described previously, the delay device 54 may include a suction cup 13 and a plate 14. In some other embodiments, the delay device 54 may include some other type of adhesive. Furthermore, some embodiments may additionally or alternatively include a gear-based delay device 54 or a fluid-channel based delay device 54.

Various embodiments include an adjusting knob in the housing configured so that a user may adjust the length of the delay of the lowering device 52 for the seat 1 and/or lid 2. Various embodiments may provide a knob that modifies a counterbalance spring torque and/or restricts the airflow though the controlled leakage channels 18.

At step 1108, the process asks whether a user applies a lifting force to the seat 1 and/or the lid 2 before the time delay expires? If so, in some embodiments, the time delay is reset. In some embodiments, based on the force applied by the user, the time delay may be partially reset, or paused (e.g., based on the durometer of the suction cups 13 and the force with which the user presses). However, in some other embodiments, the time delay is paused as the user applies a lifting force. Thus, if the user applies a threshold-lifting force to the toilet seat 1 prior to the expiration of the delay, the toilet seat 1 does not self-lower via the lowering device 52. Instead, the process returns to step 1106 where the delay device 54 is reset, partially reset, or paused. The lifting force may be an indirect force, e.g., from the user applying a lifting force to the seat 1 to lift the lid 2.

Although the delay device 54 has initiated the time delay before the seat 1 and/or lid 2 lowers, various embodiments advantageously allow the user to lower the seat 1 and/or lid 2 prior to expiration of the time delay. For example, various embodiments have a delay device 54 that includes a suction cup 13 and the plate 14, as described elsewhere in the application. Users may apply a lowering force to overcome the delay device 54. However, some embodiments may include a latch system that prevents early or accidental termination of the time delay. The latching system may include, for example, a button or a latch that is disengaged to lower the lid 2 or the seat 1 from the up positions. Additionally, or alternatively, the latching system may be used to lock the seat and/or the lid in the down position. This may be an advantageous child-proofing feature which would allow users to avoid any situations where a young child or pet may accidentally open the lid or seat and fall in.

If the user does not reapply lifting force to the seat 1, and the optional latching system is not activated, the process moves to step 1110, where the toilet seat 1 lowers after expiration of the time delay.

FIG. 12C schematically shows the toilet seat 1 lowered to the down position 50 with a freely rotating lid. In some embodiments, the lid 2 may be freely rotating, and the lowering device 52 may operate to lower the seat from the up position to the down position after a delay. If, prior to use, both the toilet seal 1 and lid 2 are in the down position 50, the user manually raises the lid prior to use. Thus, when the lid 2 is raised, the seat 1 remains in the down position 50, and the user may sit down and make use of the seat in the conventional manner. When both the lid 2 and seat 1 are raised together, the self-lowering system 100 automatically self-lowers the seat 1 after the time delay expires, while the freely-rotating lid 2 remains in the vertical position unless (or until) it is manually lowered by a user.

However, some embodiments may be configured so that lid 2 is manually moved down by the seat 1 as the seat 1 is self-lowered. To that end, various embodiments may include a friction clutch mechanism that couples the seat 1 and the lid 2.

For example, in use, the seat 1 may be in the down position 50 and the lid 2 in the upright position 49. A user may thus sit on the seat 1 and use it in the conventional manner with no further interaction. In this example, the seat 1 remains in the down position 50, and the lid 2 remains in the up position 49. However, when the user raises the seat 1 (either by itself or together with the lid 2), the lowering device 52, after expiration of the time delay, self-lowers the seat 1 to the down position 50, which also lowers the lid 2 because of a linked friction clutch mechanism (as described with reference to FIG. 15 below)

In some embodiments, the lowering device 52 is coupled via the axle 7S to the seat 1 as described previously, as shown in FIG. 13. The dampers 107 and 108 may be mounted in the same way as well.

Figure 15:
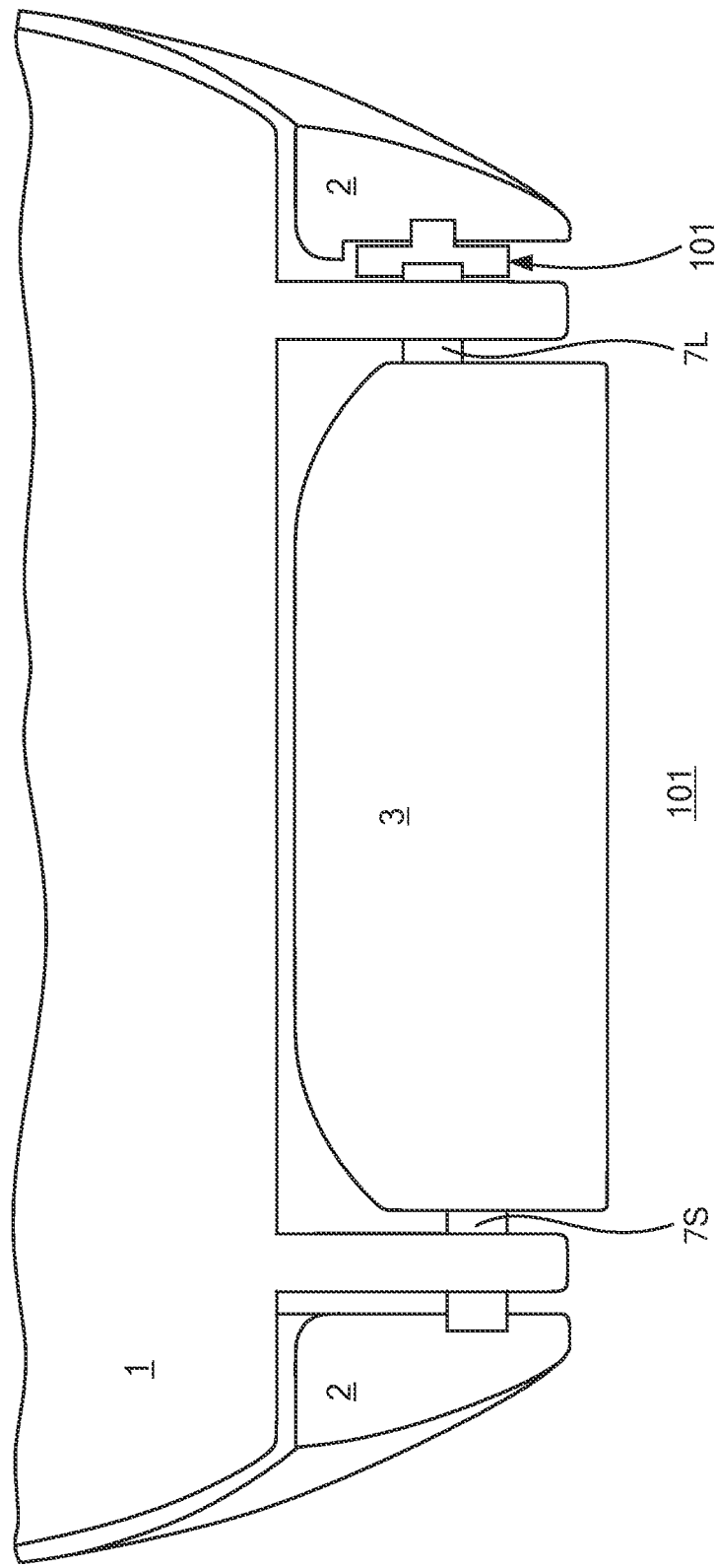
FIG. 15 schematically shows a lid closing system that couples the downward motion of the seat with the lid in accordance with illustrative embodiments.

FIG. 15 schematically shows a lid closing system 101 that couples the downward motion of the seat 1 with the lid 2 in accordance with illustrative embodiments. The lid closing system 101 may be, for example, a friction clutch mechanism. The lid closing system 101 may be mounted inside of the housing 3 or outside of the housing 3. The lid closing system 101 functions based on the torque differences between the seat and lid. When the lid 2 is manually lifted by the user from the down position 51 to the upright position 49, the torque produced by friction in the lid closing system 101 is much smaller than the torque due to the weight of horizontal seat 1, thus allowing the lid 2 to be lifted without moving the seat 1.

Figure 12D:
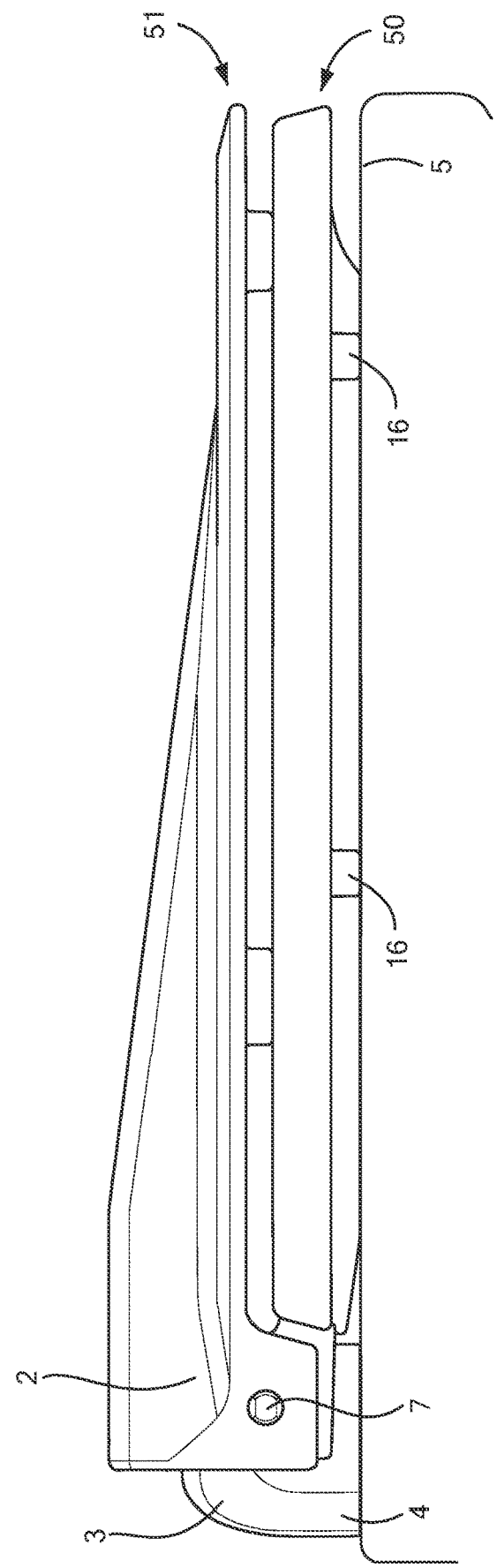

When both the seat 1 and lid 2 are in the upright position, 48, 49, they have a short horizontal lever arm relative to the axle 7, and thus a low gravitational torque relative to the axle 7 as well. Thus, when the seat 1 begins to lower via the lowering device 52, the low gravitational torque of the lid 2 in the upright position enables the friction in the lid closing system 101 to overcome the relatively low torque of the lid 2. This effectively locks the seat 1 and lid 2 together as the seat 1 self-closes towards the down position 50, which moves the lid 2 down with the seat 1. FIG. 12D schematically shows the seat 1 and the lid 2 both lowered to the down position 50, 51 by the lowering device 52 after expiration of the delay.

Figure 16A:
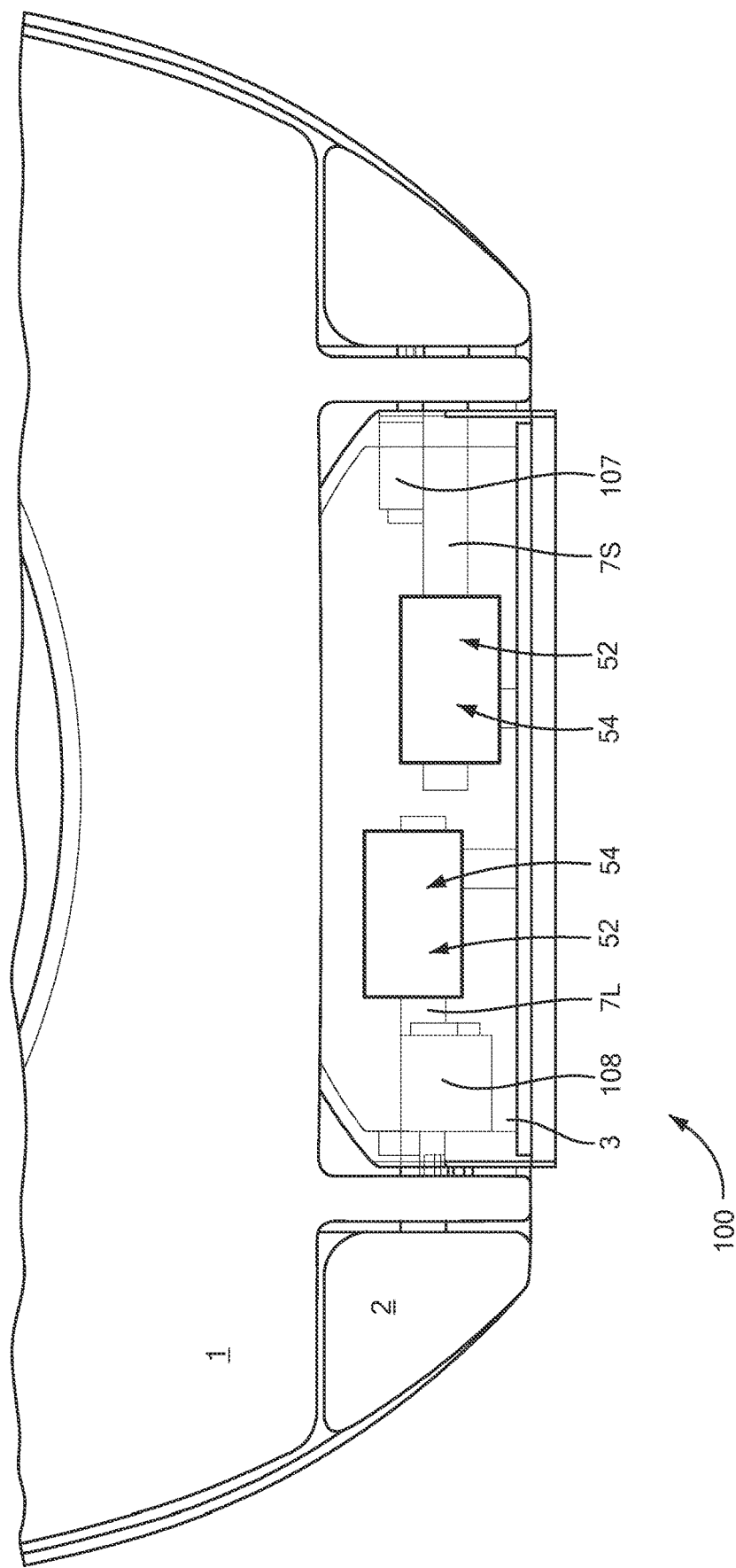
FIGS. 16A-16B schematically show an embodiment of the seat-lowering system in accordance with illustrative embodiments.
Figure 16B:
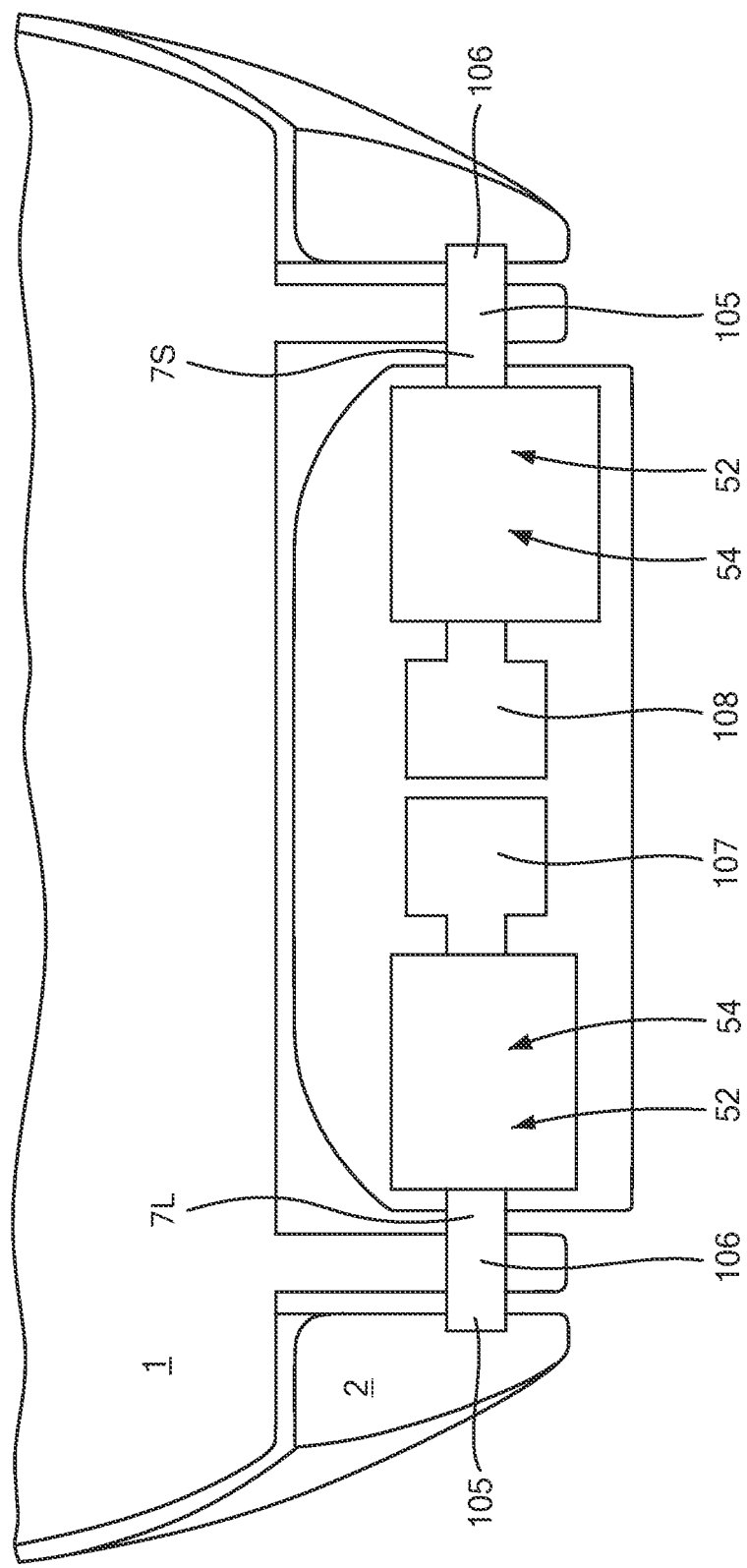

FIGS. 16A-16B schematically show an embodiment of the seat-lowering system 100 in accordance with illustrative embodiments. Illustrative embodiments may include a plurality of lowering devices 52 and/or delay devices 54. For example, FIGS. 16A-16B show a dual lowering device 52 and delay device 54 arrangement within a single housing 3. One of the lowering devices 52 and delay devices 54 operates to lower the seat 1, and the other set of lowering device 52 and delay device 54 operates to lower the lid 2. Although shown in a single housing 3, the seat lowering device 52 and seat delay device 54 may be in a different housing 3 from the lid lowering device 52 and the lid delay device 54. Furthermore, although the axis of rotation for the axle 7 for the seat lowering device 52 and the axle 7 for the lid lowering device 52 are shown as being offset and parallel, it should be understood that some embodiments may be coaxial (e.g., see FIG. 16B). However, positioning the axles 7 to be parallel may advantageously allow for a smaller perimeter for the housing 3.

In some embodiments, the lowering system 100 lowers the lid 2, as opposed to the seat 1. Accordingly, in some embodiments, the seat 1 may freely rotate. The toilet seat lid 2 may be driven by the self-lowering device 52 after the time delay, while the seat 1 remains substantially free-rotating. For example, a user may raise only the lid 2, so as to use the toilet with the seat 1 in the down position. In this case, the self-lowering system 100 is configured to lower the lid 2 after a pre-set time delay, which preferably is of sufficient length (e.g., 10 minutes or greater) to allow most users to complete their usage and stand up from the seat before the lid 2 is released.

In another use case, the user may raise both the lid 2 and seat 1 at the same time to utilize the toilet with the seat 1 in the upright position (typically with a male in the standing position). The lid 2 may thus remain in the up position until the delay device 54 expires. Then, the lowering device 52 lowers the lid 2 towards the down position 51. The downward motion of the lid 2 also pushes the seat 1 towards the down position 50. Various embodiments may include a mechanical damper 108 to partially restrain the seat 1 and prevent it from dropping too rapidly and slamming into the toilet bowl 5.

In some embodiments, it may be desirable for the lowering system 100 to lower both the lid 2 and the seat 1. To that end, both the seat 1 and the lid 2 may have their own independent lowering device 52 and delay device 54. Each of the two independent lowering devices 52 and delay devices 54 may be configured as described previously. In various embodiments, the time delays associated with the two independent lowering devices 52 may be the same or different. Additionally, illustrative embodiments may include two separate hinge housings 3, one coupled to the lid 2 and the other coupled to the seat 3.

When the lid delay is set to be shorter than the seat delay, then the expiration of the lid delay may cause the seat 1 to be forced down prematurely, under the load from the lid 2. To avoid this, various embodiments have a time delay for lowering the seat 1 that is equal to, or shorter than the time delay for lowering the lid 2, so that the lid 2 is not released ahead of the seat 1.

Various embodiments may be configured such that the lid delay is much longer than the seat delay as a means to accommodate people sitting on the seat for a long period of time. For instance, the lid delay device 54 may be set to delay the lid in the upright position for between about 1 minute and about 60 minutes, for example between 5-50 minutes, thus giving sufficient time for most users.

FIG. 11 describes a method of self-lowering a toilet seat 1 in accordance with illustrative embodiments of the invention. It should be noted that this method is substantially simplified from a longer process that may normally be used. Accordingly, the method shown in FIG. 11 may have many other steps that those skilled in the art likely would use. In addition, some of the steps may be performed in a different order than that shown, or at the same time. Furthermore, some of these steps may be optional in some embodiments. Accordingly, the process 1100 is merely exemplary of one process in accordance with illustrative embodiments of the invention. Those skilled in the art therefore can modify the process as appropriate.

As used in this specification and the claims, the singular forms "a," "an," and "the" refer to plural referents unless the context clearly dictates otherwise. For example, reference to "the lowering device" in the singular includes a plurality of lowering devices, and reference to "suction cup" in the singular includes one or more suction cups and equivalents known to those skilled in the art. Thus, in various embodiments, any reference to the singular includes a plurality, and any reference to more than one component can include the singular.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Illustrative embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Disclosed embodiments, or portions thereof, may be combined in ways not listed above and/or not explicitly claimed. Thus, one or more features from variously disclosed examples and embodiments may be combined in various ways. For example, it is to be understood that the present disclosure contemplates that, to the extent possible, one or more features of any embodiment can be combined with one or more features of any other embodiment.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A self-lowering toilet seat system comprising:
   a toilet bowl;
   a toilet seat configured to be sat upon by a user;
   a hinge rotatably coupling the toilet seat and the toilet bowl, the hinge configured so that the toilet seat is transitionable between a down position and an up position;
   a lowering device configured to self-lower the toilet seat towards the down position;
   a fixedly sealed hinge housing having a mechanical seat delay device therein, the seat delay device configured to cause a seat time delay before the lowering device causes the toilet seat to lower towards the down position, the seat delay device being engaged by a user applying a seat lifting force to raise the toilet seat towards the up position and removing the seat lifting force from the toilet seat, the seat delay device configured to reset the seat time delay when the user re-applies the lifting force before the seat delay device has expired.

2. The self-lowering toilet seat system of claim 1, further comprising:
   a lid rotatably coupled to the hinge.

3. The self-lowering toilet seat system of claim 2, further comprising a coupling between the lid and the seat, such that the lid is lowered when the seat is lowered by the seat delay device when the coupling is engaged.

4. The self-lowering toilet seat system of claim 1, wherein a duration of the seat time delay is user adjustable.

5. The self-lowering toilet seat system of claim 2, further comprising:
   a second lowering device configured to self-lower the lid towards the down position;
   a lid delay device within the sealed hinge housing, the lid delay device configured to cause a lid time delay before the lowering device causes the lid to lower towards the down position, the lid delay device being engaged by a user applying a lid lifting force to raise the lid towards the up position and removing the lid lifting force from the lid, the lid delay device configured to reset the lid time delay when the user re-applies the lifting force before the lid delay device has expired.

6. The self-lowering toilet seat system of claim 5, wherein the lid time delay is equal to or greater than the seat time delay.

7. The self-lowering toilet seat system of claim 5, further comprising a latching system configured to prevent the lid and/or the seat from moving towards the up position from the down position when the latching system is engaged.

8. The self-lowering toilet seat system of claim 5, wherein the lid delay device comprises a suction cup and an attachment surface, wherein the temporary adhesion of the cup to the attachment surface prevents the lid from self-lowering to the down position.

9. The self-lowering toilet seat system of claim 8, wherein the attachment surface includes one or more controlled leakage channels, wherein the leakage channels are covered with an airflow restriction material that is configured to restrict the rate of airflow through the channel.

10. The self-lowering toilet seat system of claim 1, wherein the seat delay device comprises a suction cup and an attachment surface, wherein the temporary adhesion of the cup to the attachment surface prevents the toilet seat from self-lowering to the down position.

11. The self-lowering toilet seat system of claim 1, wherein a perimeter of the housing fits within a footprint defined by a perimeter of the toilet bowl.

12. The self-lowering toilet seat system of claim 1, further comprising a damper on the seat and/or a lid.

13. The self-lowering toilet seat system of claim 2, further comprising a first axle coupled with the seat and a second axle coupled with the lid, the first axle and the second axle are coaxial.

14. The self-lowering toilet seat system of claim 2, further comprising a first axle coupled with the seat and a second axle coupled with the lid, the first axle and the second axle rotate around the same axis of rotation.

15. The self-lowering toilet seat system of claim 2, further comprising a first axle coupled with the seat and a second axle coupled with the lid, wherein the axes of rotation of the seat and lid are fixed relative to one another.

16. The self-lowering toilet seat system of claim 2, further comprising a second hinge housing, having a second lowering device and a second delay device for the lid.

17. The self-lowering toilet seat system of claim 1, wherein the delay device is engaged when the seat is lifted to the up position.

18. A self-lowering toilet seat lid system comprising:
a toilet bowl;
a toilet seat lid configured to rotate relative to a toilet seat;
a hinge rotatably coupling the lid and the toilet bowl, the hinge configured so that the lid is transitionable between a down position and an up position;
a lowering device configured to self-lower the lid towards the down position;
a sealed hinge housing having a mechanical delay device therein, the delay device configured to cause a lid time delay before the lowering device causes the lid to lower towards the down position, the delay device being engaged by a user applying a lid lifting force to raise the lid towards the up position and removing the lid lifting force from the lid, the delay device configured to reset the lid time delay if the user re-applies the lifting force before the delay device has expired.

19. The self-lowering toilet seat system of claim 18, further comprising:
a toilet seat rotatably coupled to the hinge.

20. The self-lowering toilet seat system of claim 18, wherein a duration of the lid time delay is user adjustable.

21. The self-lowering toilet seat system of claim 18, wherein the lid time delay is between 1 minute and 50 minutes.

22. The self-lowering toilet seat system of claim 18, further comprising a latching system configured to prevent the lid and/or the seat from moving towards the up position when the latching system is engaged.

23. The self-lowering toilet seat system of claim 18, wherein the lid delay device comprises a suction cup and an attachment surface, wherein the temporary adhesion of the cup to the attachment surface delays the lid from self-lowering to the down position.

24. The self-lowering toilet seat system of claim 23, wherein the attachment surface includes one or more controlled leakage channels.

25. A self-lowering toilet seat system comprising:
a toilet bowl;
a hinge rotatably coupling the toilet bowl with a seat and/or a lid, the hinge configured so that the seat and/or the lid is transitionable between a down position and an up position;
a lowering device configured to self-lower the seat and/or the lid towards the down position;
a hinge housing having a mechanical seat delay device therein, the seat delay device configured to cause a seat time delay before the lowering device causes the seat and/or the lid to lower towards the down position, the seat delay device being engaged by raising the toilet seat towards the up position, the seat delay device configured to reset the seat time delay when the toilet seat is forced towards the up position before the seat delay device has expired, wherein the mechanical delay device comprises a suction cup and an attachment surface.

26. The system of claim 25, wherein a temporary coupling of the cup to the attachment surface delays the seat and/or the lid from self-lowering to the down position.

27. The system of claim 25, wherein the hinge housing is fixedly sealed.

28. The system of claim 25, further comprising a second lowering device configured to self-lower the seat and/or the lid that is not self-lowered by the first lowering device.

29. The system of claim 28, further comprising a lid delay device engaged by a raising the lid towards the up position, the lid delay device configured to reset the lid time delay when the lid is forced towards the up position before the seat delay device has expired.

30. A device comprising:
a housing having a mechanical seat delay device therein, the housing configured to couple with a toilet bowl, the housing comprising a hinge configured to rotatably couple the toilet bowl with a seat and/or a lid such that the seat and/or the lid is transitionable between a down position and an up position,
the housing having a seat delay device therein, the seat delay device configured to cause a seat time delay before a lowering device causes the seat and/or the lid to lower towards the down position, the seat delay device being engaged by raising the toilet seat towards the up position, the seat delay device configured to reset the seat time delay when the toilet seat is forced towards the up position before the seat delay device has expired.

31. The device of claim 30, wherein the mechanical delay device comprises a suction cup and an attachment surface.

32. The device of claim 30, wherein the housing is sealed.

33. The device of claim 30, wherein the housing is fixedly sealed.

34. A method of self-lowering a toilet seat, the method comprising:

providing a self-lowering device, the self-lowering device comprising:

a housing having a mechanical seat delay device therein, the housing being coupled with a toilet bowl, the housing comprising a hinge configured to rotatably couple the toilet bowl with a seat and/or a lid such that the seat and/or the lid is transitionable between a down position and an up position, the housing having a seat delay device therein, the seat delay device configured to cause a seat time delay before a lowering device causes the seat and/or the lid to lower towards the down position, the seat delay device being engaged by raising the toilet seat towards the up position, the seat delay device configured to reset the seat time delay when the toilet seat is forced towards the up position before the seat delay device has expired;

lifting the seat and/or the lid towards an up position to engage a delay system that delays the seat and/or the lid from being lowered by the lowering device;

lowering the seat and/or the lid by the lowering device.

35. The method as defined by claim 34, wherein the delay system provides a predetermined time delay.

36. The method as defined by claim 35, further comprising:

forcing the seat and/or the lid towards the up position at any time prior to expiration of the predetermined time delay to reset the predetermined time delay.

37. The method as defined by claim 34, further comprising manually lowering the toilet seat and/or lid at any time prior to the expiration of the predetermined time delay without damaging the delay device or the lowering device.

38. The method as defined by claim 34, wherein the lid is freely rotating.

39. The method as defined by claim 34, wherein the mechanical delay device comprises a suction cup and an attachment surface.

40. The method as defined by claim 39, further comprising a leakage channel through the attachment surface, wherein the leakage channel is covered by a flow restriction material.

\* \* \* \* \*